United States Patent
Edmonds et al.

(10) Patent No.: US 9,562,998 B2
(45) Date of Patent: Feb. 7, 2017

(54) INCONSPICUOUS OPTICAL TAGS AND METHODS THEREFOR

(71) Applicant: 3M INNOVATIVE PROPERTIES COMPANY, St. Paul, MN (US)

(72) Inventors: William F. Edmonds, Minneapolis, MN (US); Nathaniel K. Naismith, St. Paul, MN (US); Martin B. Wolk, Woodbury, MN (US); Michael Benton Free, St. Paul, MN (US); William W. Merrill, Mahtomedi, MN (US); David T. Yust, Woodbury, MN (US); John F. Van Derlofske, III, Minneapolis, MN (US); Jun Xiao, Austin, TX (US); Albert T. Schmitz, Grand Forks, ND (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/651,300

(22) PCT Filed: Dec. 11, 2013

(86) PCT No.: PCT/US2013/074269
§ 371 (c)(1),
(2) Date: Jun. 11, 2015

(87) PCT Pub. No.: WO2014/093428
PCT Pub. Date: Jun. 19, 2014

(65) Prior Publication Data
US 2015/0317923 A1    Nov. 5, 2015

Related U.S. Application Data

(60) Provisional application No. 61/735,811, filed on Dec. 11, 2012.

(51) Int. Cl.
G06K 7/10 (2006.01)
G06K 19/06 (2006.01)
(Continued)

(52) U.S. Cl.
CPC ............. *G02B 5/208* (2013.01); *G02B 5/0284* (2013.01); *G02B 5/12* (2013.01); *G02B 5/201* (2013.01);
(Continued)

(58) Field of Classification Search
USPC ........................... 235/375, 462.01, 488, 494, 451,235/454–457, 492, 380, 383, 385
See application file for complete search history.

(56) References Cited

U.S. PATENT DOCUMENTS 5,882,774 A    3/1999  Jonza
6,024,455 A *  2/2000  O'Neill ................. G02B 5/124
                                                    283/85
(Continued)

FOREIGN PATENT DOCUMENTS

JP    2005-91785    4/2005
WO    WO 99-35819    7/1999
(Continued)

OTHER PUBLICATIONS

Sternberg, "Biomedical Image Processing", IEEE, 1983, pp. 22-34.
International Search Report for PCT International Application No. PCT/US2013/074269 mailed on Oct. 8, 2014, 8 pages.

*Primary Examiner* — Tuyen K Vo

(57) ABSTRACT

Tags are made from optical films to provide a pattern that is inconspicuous to ordinary observers, but that is detectable by a camera or other imaging device. The pattern is provided by first and second portions of a patterned layer, the first portions selectively filtering at least a portion of blue visible light from other visible light wavelengths. Filtering in the portion of the blue region helps make the pattern incon-
(Continued)

spicuous. The tags may also include an indicia layer configured to mark a location of the pattern, and a contrast enhancing layer disposed behind the patterned layer and configured to enhance a contrast of the pattern. In some cases, the first portions of the patterned layer may filter optical wavelengths other than blue, such as near-infrared light. The pattern may comprise machine-readable information, e.g., a linear bar code or a 2-D bar code. Associated methods and systems are also disclosed.

36 Claims, 12 Drawing Sheets

(51) Int. Cl.
G02B 5/20 (2006.01)
G09F 13/16 (2006.01)
G02B 5/28 (2006.01)
G02B 5/02 (2006.01)
G02B 5/12 (2006.01)
G06K 7/14 (2006.01)
H04N 5/225 (2006.01)
G02B 5/22 (2006.01)
G09F 3/00 (2006.01)
G09F 3/10 (2006.01)
G06K 7/12 (2006.01)

(52) U.S. Cl.
CPC .............. G02B 5/223 (2013.01); G02B 5/285 (2013.01); G06K 7/1447 (2013.01); G06K 19/0614 (2013.01); G06K 19/06103 (2013.01); G09F 3/0294 (2013.01); G09F 3/0297 (2013.01); G09F 3/10 (2013.01); G09F 13/16 (2013.01); H04N 5/2256 (2013.01); G06K 7/12 (2013.01)

(56) References Cited

U.S. PATENT DOCUMENTS

| | | | |
|---|---|---|---|
| 6,174,400 B1 | 1/2001 | Krutak | |
| 6,352,761 B1 | 3/2002 | Hebrink | |
| 6,531,230 B1 | 3/2003 | Weber | |
| 7,328,847 B1 | 2/2008 | Shen | |
| 7,353,994 B2* | 4/2008 | Farrall | G06K 7/12 235/454 |
| 2003/0111542 A1* | 6/2003 | Look | G02B 5/128 235/494 |
| 2004/0101676 A1* | 5/2004 | Phillips | B32B 27/36 428/323 |
| 2004/0149830 A1* | 8/2004 | Allen | B41J 2/325 235/494 |
| 2007/0152067 A1 | 7/2007 | Bi | |
| 2007/0267500 A1 | 11/2007 | Juds | |
| 2008/0000976 A1 | 1/2008 | Thomas | |
| 2008/0231976 A1* | 9/2008 | Commander | B42D 25/29 359/833 |
| 2008/0246894 A1* | 10/2008 | Power | B42D 25/00 349/1 |
| 2009/0027775 A1* | 1/2009 | Nilsen | G06K 19/06046 359/515 |
| 2009/0050700 A1* | 2/2009 | Kamijoh | G06K 17/0022 235/440 |
| 2010/0025476 A1* | 2/2010 | Widzinski, Jr. | G09F 3/0294 235/488 |
| 2010/0119738 A1 | 5/2010 | Suzuki | |
| 2010/0123943 A1* | 5/2010 | Umemoto | G02B 5/0221 359/2 |
| 2010/0147949 A1 | 6/2010 | Sakuma | |
| 2011/0249332 A1* | 10/2011 | Merrill | G02B 5/0841 359/485.01 |
| 2011/0255163 A1 | 10/2011 | Merrill | |
| 2011/0269952 A1 | 11/2011 | Kang et al. | |
| 2012/0021152 A1 | 1/2012 | Glaser et al. | |
| 2012/0063676 A1* | 3/2012 | Kawabe | G06K 19/06037 382/162 |
| 2012/0224743 A1 | 9/2012 | Rodriguez | |
| 2013/0099000 A1* | 4/2013 | Hoshino | G02B 5/3016 235/457 |
| 2013/0314788 A1* | 11/2013 | Chang | B29D 11/00788 359/489.01 |

FOREIGN PATENT DOCUMENTS

| | | |
|---|---|---|
| WO | WO 2010-075340 | 7/2010 |
| WO | WO 2010-075357 | 7/2010 |
| WO | WO 2010-075363 | 7/2010 |
| WO | WO 2010-075373 | 7/2010 |
| WO | WO 2010-075383 | 7/2010 |
| WO | WO 2010/146107 | 12/2010 |
| WO | WO 2011-060086 | 5/2011 |
| WO | WO 2011-129832 | 10/2011 |
| WO | WO 2012-003213 | 1/2012 |
| WO | WO 2012-003215 | 1/2012 |
| WO | WO 2012-003247 | 1/2012 |
| WO | WO 2012-012118 | 1/2012 |
| WO | WO 2012-012177 | 1/2012 |
| WO | WO 2012-054320 | 4/2012 |
| WO | WO 2014-116431 | 7/2014 |
| WO | WO 2015-034910 | 3/2015 |

* cited by examiner

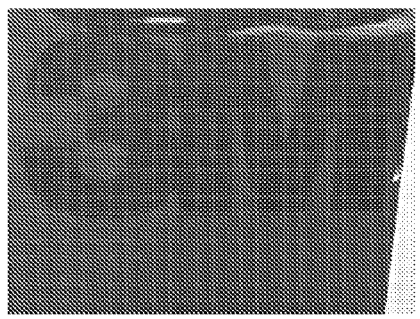 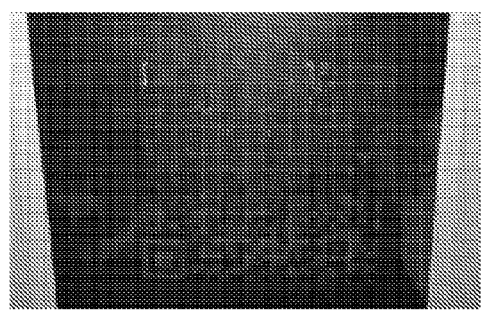
FIG. 12A  FIG. 12B
 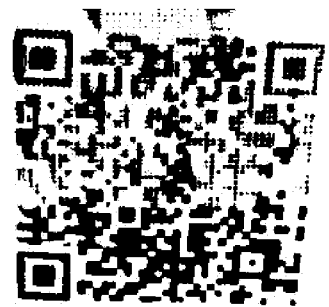
FIG. 12C  FIG. 12D

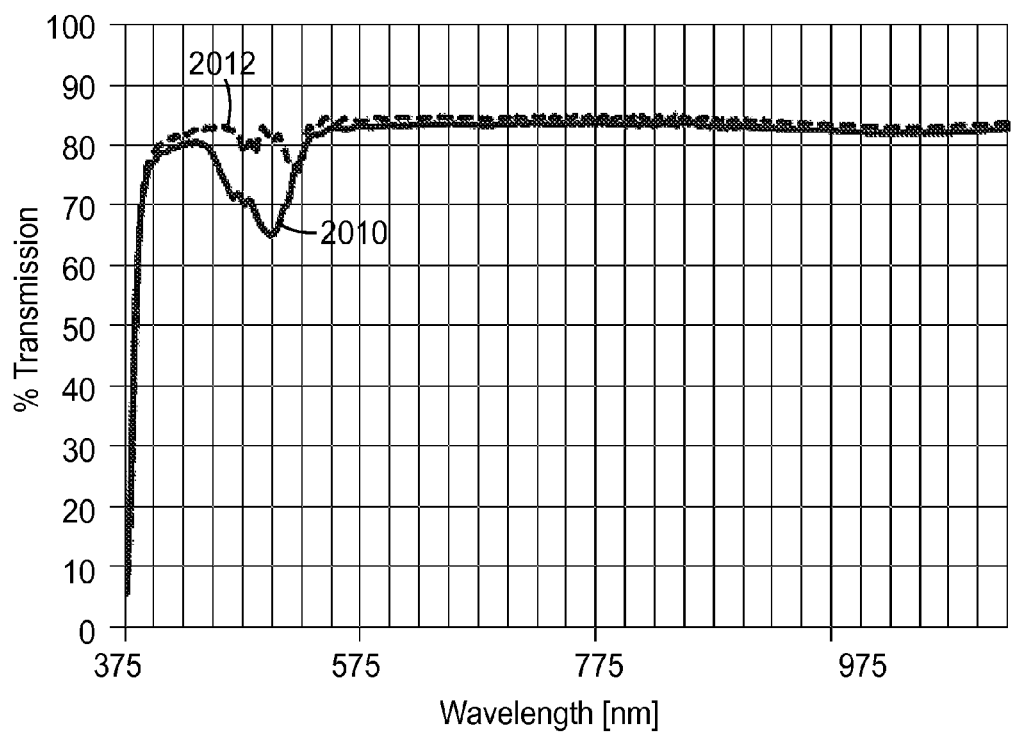
FIG. 20
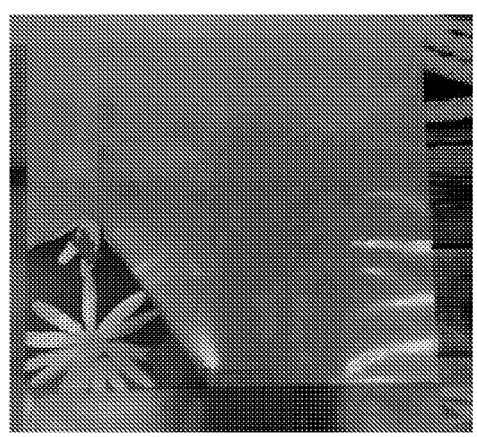 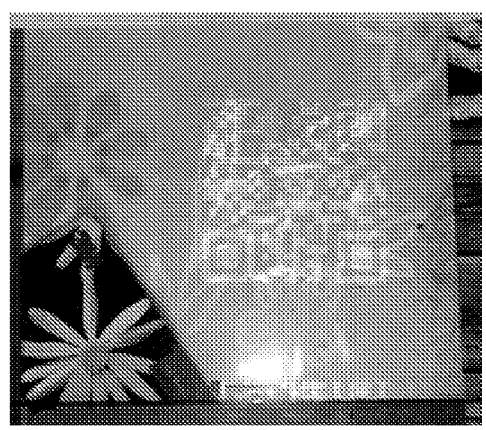
FIG. 21       FIG. 22

INCONSPICUOUS OPTICAL TAGS AND METHODS THEREFOR

FIELD OF THE INVENTION

This invention relates generally to optical films, with particular application to such films that can be used as tags to provide machine-readable information, but in a manner that is inconspicuous or concealed to ordinary observers.

BACKGROUND

A wide variety of security devices and tags are known. Such devices and tags may for example be applied to a product, package, or document as an indicator of authenticity. Some such tags incorporate an optical film whose relevant features are difficult to copy or counterfeit.

BRIEF SUMMARY

We have developed a family of optical tags and related security devices, and methods of making and using such tags, that can provide machine-readable information in a pattern that is inconspicuous or concealed to ordinary observers. However, despite being inconspicuous, the pattern can in many embodiments be detected and read by ordinary camera systems that operate over the visible wavelength range. For example, in many embodiments, the pattern can be detected by the standard camera system provided on commercially available smart phones or similar mobile electronic devices. However, such a smart phone or device may require a specialized image processing application ("app") or program in order to decipher or read machine-readable information from the detected pattern. In some cases, a camera system or other detection device may be used that is specifically tailored for operation with the optical tag.

The pattern is provided by first and second portions of a patterned layer, the first portions selectively filtering at least a portion of blue visible light from other visible light wavelengths. Filtering in the portion of the blue region helps make the pattern inconspicuous. The tags may also include an indicia layer configured to mark a location of the pattern, and a contrast enhancing layer disposed behind the patterned layer and configured to enhance the contrast of the pattern. In some cases, rather than filtering blue visible wavelengths, the first portions of the patterned layer may instead selectively filter other optical wavelengths, such as near-infrared light. The pattern may comprise machine-readable information, e.g., a linear bar code or a 2-D bar code.

The present application therefore discloses optical tags having an inconspicuous pattern, the optical tags including a patterned layer, an indicia layer, and a contrast enhancing layer. The patterned layer may have distinguishable first and second portions that define the pattern, the first portions selectively filtering at least a portion of blue visible light from other visible light wavelengths. The indicia layer may be disposed to overlap the pattern so as to mark a location of the pattern. The contrast enhancing layer may be disposed behind the patterned layer, and configured to enhance a contrast of the pattern. Note in this regard that "visible light" and like terms refer to electromagnetic radiation in the wavelength range from 380 to 760 nm, and "blue light" and like terms refer to visible light in the wavelength range from 380 to 500 nm.

The inconspicuous pattern may be or comprise a logo, image, text, or symbol, e.g., a 1-dimensional ("1-D", i.e., linear) or 2-dimensional ("2-D") machine-readable bar code pattern. One type of 2-D bar code pattern that is currently in wide use, and is suitable for use in the disclosed embodiments, is known as a Quick Response Code or "QR Code".

The patterned layer may include a multilayer optical film that reflects and transmits visible light differently in the first and second portions of the patterned layer, the transmission and reflection of a given portion of the multilayer optical film resulting from constructive or destructive interference of light reflected at interfaces of (typically) tens, hundreds, or thousands of individual microlayers in one or more microlayer stacks. The patterned layer may include an absorptive material that is present in the first portions more than in the second portions of the patterned layer, or that is present in the second portions more than in the first portions of the patterned layer.

In some cases, the indicia layer may be disposed between the patterned layer and the contrast enhancing layer. At normal incidence, the first portions may selectively block the portion of blue visible light and substantially transmit the other visible light wavelengths. Furthermore, at normal incidence, the second portions may substantially transmit the portion of blue visible light and also substantially transmit the other visible light wavelengths. The portion of blue visible light may be defined by a spectral band having at normal incidence a long wavelength band edge of no greater than 480 nm, or no greater than 440 nm. The first portions may selectively block the portion of blue visible light by selectively reflecting the portion of blue visible light. Alternatively, the first portions may selectively block the portion of blue visible light by selectively absorbing the portion of blue visible light.

In some cases, the patterned layer may be disposed between the indicia layer and the contrast enhancing layer. At normal incidence, the first portions may selectively transmit the portion of blue visible light and substantially block the other visible light wavelengths. Furthermore, at normal incidence, the second portions may substantially block the portion of blue visible light and also substantially block the other visible light wavelengths. (Alternatively, at normal incidence the first portions may selectively block the portion of blue visible light and substantially transmit the other visible wavelengths, and the second portions may substantially transmit the portion of blue visible light and also substantially transmit the other visible light wavelengths.)

The portion of blue visible light may be defined by a spectral band having at normal incidence a long wavelength band edge of no greater than 480 nm, or no greater than 440 nm. The first portions may selectively block the other visible light wavelengths by selectively reflecting the other visible light wavelengths. The indicia layer may cover the patterned layer, and the indicia layer may include an indicia portion that covers at least a portion of the pattern, the indicia portion having light-blocking regions and light-transmitting regions. The light-transmitting regions may include perforations in the indicia layer. The inconspicuous pattern may be or include a bar code pattern, and the perforations may be sized and distributed such that enough of the bar code pattern can be detected so that the bar code pattern can be read. The perforations may also be aligned with features of the inconspicuous pattern.

The contrast enhancing layer may be diffusely reflective, and/or retroreflective, and/or absorptive. The indicia layer may at least partially obscure the pattern.

We also disclose optical tags having an inconspicuous machine-readable bar code pattern, the optical tag including a patterned layer, an indicia layer, and a contrast enhancing layer. The patterned layer has distinguishable first and second portions that define the bar code pattern, and the first portions selectively filter a first spectral portion of light from other light wavelengths. The indicia layer is disposed to overlap the bar code pattern so as to mark a location of the pattern, and, in some cases, to at least partially obscure the pattern. The contrast enhancing layer is disposed behind the patterned layer and configured to enhance a contrast of the bar code pattern.

The first spectral portion of light may be defined by a spectral band having at normal incidence a long wavelength band edge of no greater than 480 nm. Alternatively, the first spectral portion of light may be defined by a spectral band having at normal incidence a short wavelength band edge of no less than 630 nm, or no less than 950 nm.

We also disclose methods of reading optical tags having an inconspicuous pattern, the methods including illuminating the tag, and imaging the illuminated tag to provide a full-color image. The imaging may be performed by a camera or other suitable detection device. The full-color image may have red, green, and blue color components, for example. The methods may further include isolating the blue color components to provide a monochrome image from the full-color image, the monochrome image providing enhanced detection of the pattern relative to the full-color image.

The pattern may be or include a machine-readable bar code pattern, and the method may further include analyzing the monochrome image to read the bar code pattern. The tag may include a retroreflective layer, and the illuminating may occur along a first optical path and the camera may image the tag along a second optical path, and the first and second optical paths may be sufficiently aligned so that retroreflected light enhances contrast of the pattern in the monochrome image. The illuminating and imaging may be carried out by a handheld device, and the isolating may also be carried out by the handheld device. The handheld device may be a mobile phone.

We also disclose methods of reading optical tags having an inconspicuous pattern, the method including illuminating the tag, and imaging the illuminated tag to provide a full-color image. The imaging may be performed by a camera or other suitable detection device. The full-color image may have first, second, and third color components. The methods may further include isolating the first color components to provide a monochrome image from the full-color image, the monochrome image providing enhanced detection of the pattern relative to the full-color image. The first, second, and third color components may be blue, green, and red color components respectively.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 12A is a photograph of the optical tag made using the patterned layer of FIG. 11, this photograph taken with the standard camera of a commercial handheld device, and using ambient room light rather than the flash provided in the handheld device, the photograph being a full-color photograph but converted to grayscale;

FIG. 12B is a photograph similar to that of FIG. 12A, except that this photograph was taken using the flash provided in the handheld device;

FIG. 12C is a photograph similar to that of FIG. 12B, except that rather than being a full-color photograph, it is a photograph that results from isolating blue color values from the red and green color values in the photograph of FIG. 12B;

FIG. 12D is an image that was obtained by subjecting the image in FIG. 12C to certain image processing techniques so as to make the machine-readable pattern more apparent and readable;

FIG. 20 is a graph showing the measured spectral transmission (for normally incident light) of different portions of another broadband transmissive multilayer optical film that was fabricated and used as a patterned layer in an optical tag; and FIGS. 21 and 22 are images of the patterned layer of FIG. 20 in combination with an indicia layer and a diffuse reflective backing, the image of FIG. 21 being taken in ambient light with no flash and the image of FIG. 22 being taken with a flash.

In the figures, like reference numerals designate like elements.

DETAILED DESCRIPTION OF ILLUSTRATIVE EMBODIMENTS

Figure 1:
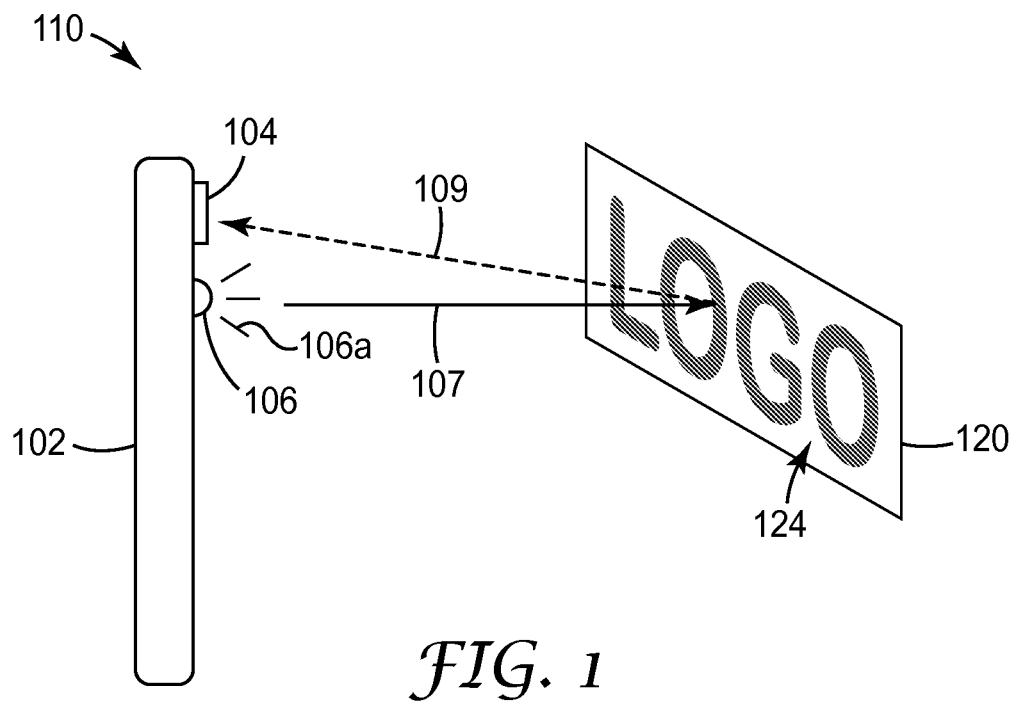
FIG. 1 is a schematic perspective view of a system in which a handheld device is being used to detect an inconspicuous pattern in an optical tag.

In FIG. 1, a system 110 includes a handheld device 102 and an optical tag 120. The handheld device 110 may be or include any suitable portable imaging device, e.g., a mobile phone such as a smart phone equipped with a camera 104 and a flash 106. The tag 120 includes a pattern (not shown) that is inconspicuous or concealed, the tag also including an indicia 124 which is disposed to overlap the inconspicuous pattern so as to mark the location of the pattern. In the figure, for illustration, the indicia 124 is the word "LOGO", because the indicia may in some cases be a product identifier such as a corporate logo or trademark. However, the indicia 124 may in general be or include any suitable logo, image, text, or symbol.

The device 102 is used to detect the inconspicuous pattern. This may be done using the camera 104 with the flash 106. Thus, for example, while the flash 106 is energized, it emits light 106a, some of which illuminates the tag 120. The emitted light 106a is typically white. Stated differently, the light 106a typically includes a sufficient amount of short visible wavelengths (e.g. blue light), long visible wavelengths (e.g. red light), and intermediate visible wavelengths (e.g. green light) so that an ordinary observer would recognize the light 106a as being some shade of "white", regardless of whether the emitted light 106a is smoothly distributed across the visible wavelength spectrum or not (e.g. it may be or comprise isolated narrow emission bands or peaks). However, the flash 106 need not emit white light, and in some embodiments the flash 106 may emit light of a particular (non-white) color or narrow wavelength band, e.g., blue visible light, or light that is otherwise substantially matched to the wavelength band being filtered by the patterned layer, as discussed further below. In any case, some of the light 106a is then reflected or scattered by the tag 120 back towards the aperture of the camera 104. To the extent the tag 120 is also exposed to ambient light, such as office lighting and/or direct or indirect sunlight, such ambient light may also be reflected or scattered by the tag back towards the camera 104. The light 106a from the flash, and as well as any scattered or reflected ambient light, enters the camera 104 to produce an image.

The tag 120 may also include a contrast enhancing layer, not shown in FIG. 1. Contrast enhancing layers are discussed in further detail below, but in some cases the contrast enhancing layer may be or comprise a retroreflective film. Retroreflective films are useful in systems where the axis of illumination and the axis of observation are parallel or nearly parallel to each other. For example, in the system 110 of FIG. 1, a given portion of the tag 120 is illuminated by the flash 106 along an illumination vector 107, and reflected or scattered light from that portion of the tag propagates along an observation vector 109 on its way to the aperture of the camera 104. These vectors 107, 109 define illumination and observation axes, respectively. The angle between these axes is determined by geometrical factors such as the distance from the flash 106 to the camera 104, and the distance from the device 102 to the tag 120. The distances can be selected such that the angle between the illumination and observation axes is small, e.g. less than 4 degrees, less than 2 degrees, less than 1 degree, or less than 0.5 degrees of arc, whereby light retroreflected by the tag from the flash dominates light entering the camera 104 from sources other than the flash 106. The relatively large amount of retroreflected light can be used to enhance contrast of the inconspicuous pattern, as imaged by the camera 104. In currently sold iPhones, the distance from the camera lens to the LED flash is approximately 10 mm. For such a device, a camera-to-tag distance of 6 inches corresponds to an angle between the illumination and observation axes of approximately 3.8 degrees.

Figure 2:
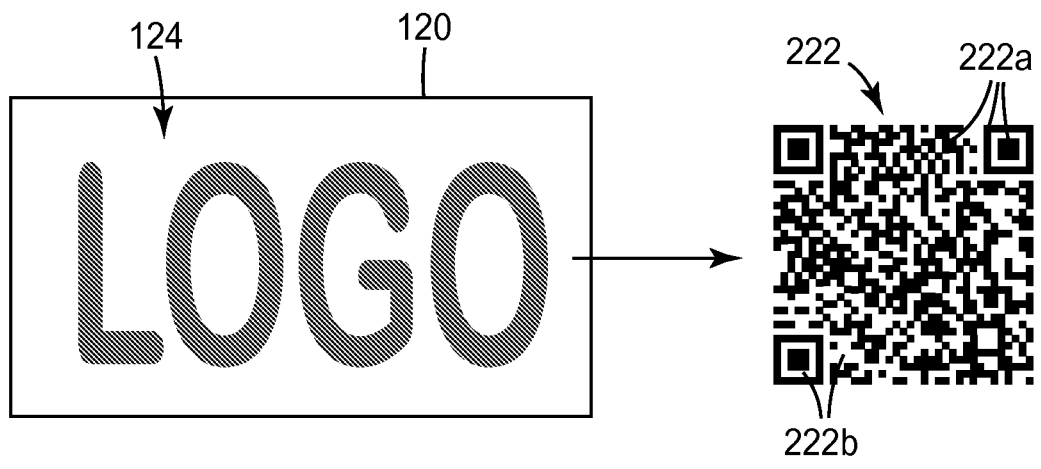
FIG. 2 is a schematic front view of the optical tag of FIG. 1 under ordinary observing conditions, the figure also showing a front view of an exemplary pattern that can be included as part of the optical tag, after such pattern has been made more conspicuous e.g. by image processing.

The tag 120 may have an appearance under ordinary observing conditions as shown schematically at the left side of FIG. 2. Thus, ordinary observers who encounter the tag 120 under typical ambient lighting conditions, such as in a store, shopping mall, office, factory, or home environment, may not notice that the tag contains any pattern or information other than the indicia 124. However, as indicated in FIG. 2, the tag 120 does include an information-conveying pattern that is independent and distinct from the indicia 124. An exemplary pattern that may be used as such an inconspicuous or concealed pattern is shown as pattern 222 in FIG. 2. The pattern 222 may be or comprise a QR Code or any other type of 2-D bar code. Alternatively, the pattern 222 may be or comprise a 1-D bar code, or any desired logo, image, text, or symbol. 1-D or 2-D bar codes are of particular interest because they contain information in the form of a digitally encoded image that can be readily deciphered or read by a machine, e.g., a camera or scanner in combination with suitably adapted software. However, in some cases it may be desirable for the inconspicuous pattern to be in the form of a logo, image, text, or symbol that does not contain machine-readable information. The pattern may be defined in terms of first portions 222a, which are shown as black or opaque in the figure, and complementary second portions 222b, which may be white or clear.

The pattern 222 is preferably physically configured to overlap the indicia 124, such that the indicia marks the location of the pattern 222. In this way, the indicia 124 may serve as an indicator or marker to a user, so that the user knows, for example, where to point their camera phone or other detection device to obtain the concealed information. The user may therefore point the detection device at the indicia 124 and, even if the user does not see or easily notice the pattern 222, the detection device detects the pattern 222 and may further analyze or read it to obtain information encoded in the pattern 222. The device may further be programmed to carry out one or more actions based on the obtained information, e.g., the device may activate a web browser and/or trigger the web browser to visit a web site based on the obtained information. The physical overlap of the indicia 124 and the pattern 222 can be used to preserve or reduce the "real estate" (surface area) of the film or product to which it is applied. That is, the physical area occupied by the pattern 222 in plan view need not be dedicated exclusively to the pattern 222, but can be shared with the indicia 124 to the extent of the overlap. Furthermore in that regard, the pattern 222 and the indicia 124 may occupy bounded spaces or areas in plan view, and such bounded spaces may have physical areas that are the same or similar to each other. The indicia 124 and pattern 222 in FIG. 2, for example, occupy respective bounded spaces whose plan view surface areas are similar in size to each other, e.g., within a factor of 2 of each other. Alternatively, the indicia 124 may be reduced (or increased) in size relative to the pattern 222, or vice versa, such that the bounded space occupied by the indicia has a plan view surface area that is substantially greater than, or substantially less than, a bounded space occupied by the inconspicuous pattern. For example, the respective bounded spaces may have plan view surface areas that are related to each other by more than a factor of 2.

In some cases the indicia 124 and the information encoded in the pattern 222 may be related. For example, the indicia may be or include a corporate logo for a given company or other enterprise, and the pattern 222 may contain encoded information representing an internet website for the company, or for a product or service offered by the company. In other cases, the indicia 124 and the information encoded in the pattern 222 may not be related.

Figure 3:
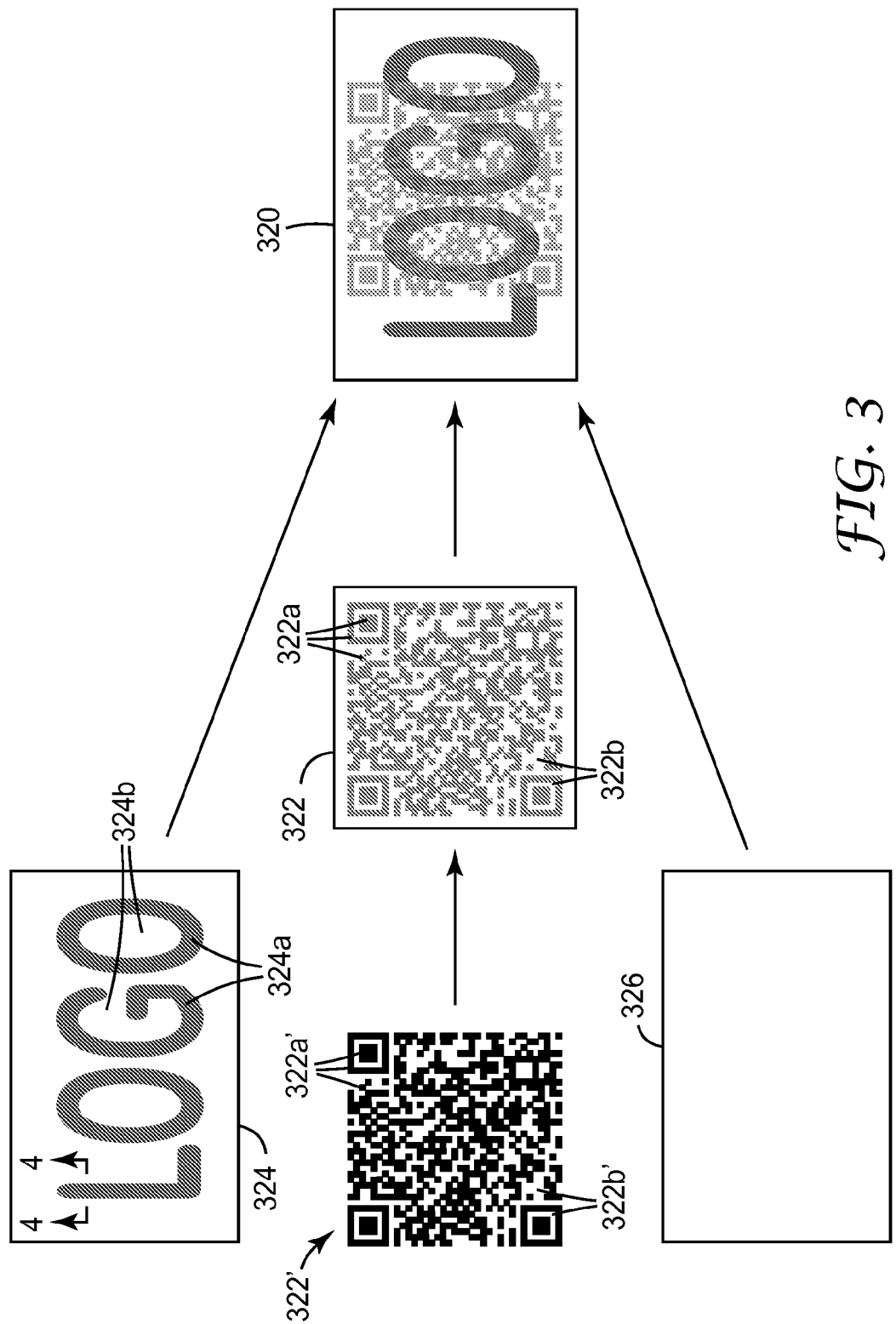
FIG. 3 is a schematic diagram showing how a patterned layer, an indicia layer, and a contrast enhancing layer can be combined to provide an optical tag with an inconspicuous or concealed pattern that comprises machine-readable information.

Turning now to FIG. 3, we see there in schematic form various components that may be combined to provide an optical tag 320, the optical tag having an inconspicuous or concealed pattern that comprises machine-readable information. The tag 320 in particular includes a patterned layer 322, an indicia layer 324, and a contrast enhancing layer 326. Although only these layers are shown, the reader will understand that the tag 320 may include additional layers and coatings if desired. For example, the tag 320 may include one or more adhesive layers, overcoats, hard coats, substrates, release liners, anti-reflection coatings, dyes, pigments, inks, and/or holographic elements, or the like. Alternatively, the tag 320 may include no such additional layers and coatings if desired. The layers 322, 324, 326 may in some cases be freestanding, self-supporting films that are separately fabricated and later adhered to each other by a lamination process, but in other cases one or more of the layers 322, 324, 326 may not be freestanding or self-supporting, e.g., such layer or layers may be printed, coated, or otherwise deposited onto one or more other layers. Furthermore, any one of the layers 322, 324, 326 may be a single monolithic or unitary layer (e.g. with no detectable sub-layer construction), or alternatively a combination of two, three, or more distinct sub-layers that are joined together and attached to each other.

The patterned layer 322 includes first portions 322a and complementary second portions 322b, these portions preferably defining a machine-readable pattern such as a QR Code, although other patterns can be used. The pattern defined by these portions of layer 322 can be compared to a substantially similar binary pattern 322'. The binary pattern 322' has first portions 322a' and complementary second portions 322b' which define the binary pattern. The pattern 322' is referred to as a binary pattern because the first portions 322a' are assumed to be completely black or opaque, and the second portions 322b' are assumed to be completely white or transparent. The completely black and completely white portions allow the binary pattern 322' to be easily detected by suitable camera systems or scanners; however, they also render the binary pattern 322' easily observable to ordinary observers. For this reason, rather than incorporating the binary pattern 322' as-is into the optical tag 320, it is first modified in order to render it less conspicuous.

We therefore first transform the first portions 322a' into the first portions 322a, wherein the first portions 322a have the identical geometry and layout as the portions 322a', but rather than being completely opaque, the portions 322a are made to selectively filter at least a portion of blue visible light from other visible light wavelengths. (In alternative embodiments, rather than filtering blue visible wavelengths, the first portions 322a may instead selectively filter other optical wavelengths, such as near-infrared light.) By selectively filtering only some optical wavelengths, we render the first portions 322a, and more particularly the pattern formed by the combination of first portions 322a and second portions 322b, significantly less noticeable, e.g., inconspicuous, to ordinary observers. This selective filtering of the portions 322a may be the only, or at least the primary, significant difference with regard to optical transmission or reflection characteristics between the portions 322a and the portions 322b. That is, the portions 322b may have substantially the same or similar optical transmission and reflection characteristics as the portions 322a, except that the portions 322b would not have the selective filtering characteristic provided by the portions 322a. In some cases, the selective filtering may constitute reflecting the selected narrow band of wavelengths, and transmitting the remaining wavelengths. In other cases, the selective filtering may constitute absorbing the selected narrow band of wavelengths, and transmitting the remaining wavelengths. In other cases, the selective filtering may constitute transmitting the selected narrow band of wavelengths, and reflecting the remaining wavelengths. In still other cases, the selective filtering may constitute transmitting the selected narrow band of wavelengths, and absorbing the remaining wavelengths.

In the foregoing description, the portions of the patterned layer 322 that selectively filter at least a portion of blue visible light, referred to as first portions of the patterned layer, correspond to the black or opaque portions of the underlying binary pattern (e.g. the machine-readable QR Code seen in FIG. 3), while the remaining complementary portions, which are referred to as second portions of the patterned layer, correspond to the white or clear portions of the underlying binary pattern. The reader will understand that the roles of these elements may be reversed or otherwise changed. For example, in the embodiment of FIG. 3, as well as in other disclosed embodiments, the first portions of the patterned layer, which selectively filter at least a portion of blue visible light (or other selected optical wavelengths), may correspond to the white or clear portions of an underlying pattern, while the complementary second portions may correspond to the black or opaque portions of the underlying pattern.

In some cases, the patterned layer 322 may be or comprise a multilayer optical film that has been pattern-wise treated or processed (e.g. selectively in the portions 322a, or selectively in the portions 322b) to provide the selective filtering characteristic in the portions 322a. Such patterned multilayer optical films are discussed in one or more of: WO 2010/075357 (Merrill et al.), "Internally Patterned Multilayer Optical Films Using Spatially Selective Birefringence Reduction"; WO 2010/075363 (Merrill et al.), "Internally Patterned Multilayer Optical Films with Multiple Birefringent Layers"; and WO 2010/075373 (Merrill et al.), "Multilayer Optical Films Suitable for Bi-Level Internal Patterning". These references discuss, among other things, multilayer optical films having at least some birefringent interior microlayers, where the multilayer optical film may initially be spatially uniform along the plane of the film, but the multilayer optical film is then subjected to localized heating in a pattern-wise fashion so as to reduce the birefringence of at least some of the interior layers in one in-plane zone relative to another in-plane zone. The reduced birefringence changes the optical transmission and reflection characteristics of the film in the treated areas relative to untreated areas that were not subjected to localized heating. The normally incident transmission through, or the normal angle reflection from, the treated areas of the film may increase or decrease by, for example, 10%, 20%, or 50% or more over a spectral band of interest, e.g., over at least a portion of blue visible wavelengths, relative to untreated areas of the film. The pattern-wise localized heating may be carried out by exposing the multilayer optical film to a suitable patterned or scanned laser beam or other optical radiation that is absorbed by the film, or by exposing selected portions of the multilayer optical film to radiant heat. In any case, the teachings of these references can be used to provide a multilayer optical film suitable for use as the patterned layer 322. If desired, the multilayer optical films that have been patterned using these techniques can have little or no absorptivity over the selected band of interest (e.g. a portion of blue visible wavelengths) in both the treated and untreated areas, such that, for example, light that is not reflected by the respective portions 322a, 322b is substantially transmitted.

The patterned layer 322 may alternatively or in addition be or comprise a film that has been pattern-wise printed with a suitable colored ink, dye, or pigment. For example, a substantially transparent, clear film of polyester or other suitable transparent material may be used as a carrier layer on which is printed a conventional colored ink that selectively absorbs or reflects some wavelengths and transmits other wavelengths. If desired, more than one ink may be printed so as to provide the desired optical characteristics in the portions 322a, 322b. The carrier layer may also in some cases not be clear but have a variable transmission as a function of wavelength such that it also preferentially transmits some wavelengths and absorbs or reflects other wavelengths.

Regardless of the details of construction of the patterned layer 322, the first portions 322a preferably selectively filter at least a portion of blue visible light from other visible light wavelengths.

The optical tag 320 also comprises the indicia layer 324. The indicia provided by the indicia layer, which in this case is the word "LOGO", is disposed to overlap the machine-readable pattern of patterned layer 322, so as to mark the location of the pattern. This is shown in FIG. 3 by the faint machine-readable pattern superimposed on the word "LOGO" in the tag 320. Thus, even though users may not see or easily notice the machine-readable pattern, the users can be taught to point their cameras or other detection devices at the indicia to obtain the concealed information in such pattern.

The indicia layer 324 may comprise first portions 324a and second portions 324b, which may correspond to foreground and background portions respectively of the indicia. In the embodiment of FIG. 3, the first portions 324a are shaded to indicate they block light to a greater extent than second portions 324b. Despite the increased light blocking in the first portions 324a, the indicia layer may nevertheless be configured so that it transmits, preferably over an extended area that includes both the first portions 324a and the second portions 324b, at least some of the type of light that is selectively filtered by the first portions 322a of the patterned layer 322, e.g., the pertinent portion of blue visible light. Two approaches for achieving this light transmission are shown in FIGS. 4A and 4B.

Figure 4A:
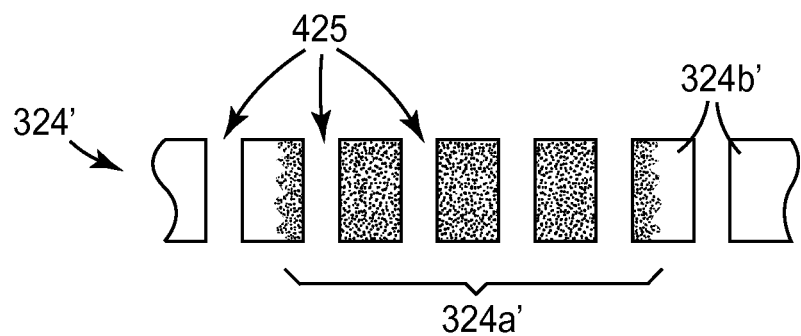
FIG. 4A is a schematic cross-sectional view along the line 4-4 in FIG. 3 for one possible embodiment of the indicia layer.

In FIG. 4A, a portion of an indicia layer 324' is shown that may be the same as or similar to the indicia layer 324 in FIG. 3, and first and second portions 324a' and 324b' may likewise be the same as or similar to the first and second portions 324a, 324b, respectively, of FIG. 3. Thus, first portion 324a' is shown shaded to indicate it blocks light to a greater extent than second portion 324b'. However, in the indicia layer 324', perforations or holes 425 are provided so that the indicia layer is at least partially transmissive to light in both the first portions 324a' and the second portions 324b'. The holes may be arranged in a regular repeating array, or they may be distributed in a random or semi-random fashion, and they may have a uniform size or variable sizes. Preferably, the holes are sized and distributed such that when the indicia layer is combined with the patterned layer in a tag, enough of the machine-readable pattern, such as a bar code pattern, can be detected to enable the pattern to be reliably read with little or no loss of information. The perforations may, for example, be aligned with features of the inconspicuous pattern.

An alternative to the perforated construction of FIG. 4A is half-tone printing. With this technique, the relatively light-blocking foreground portions of the indicia layer can nevertheless be partially transmissive by printing the foreground portions in a fine dot pattern, with spaces between the dots. If the fine dot pattern is printed on a transparent or substantially light-transmissive carrier film, the foreground portions will be light transmissive by virtue of light being transmitted in the spaces between the dots.

Figure 4B:
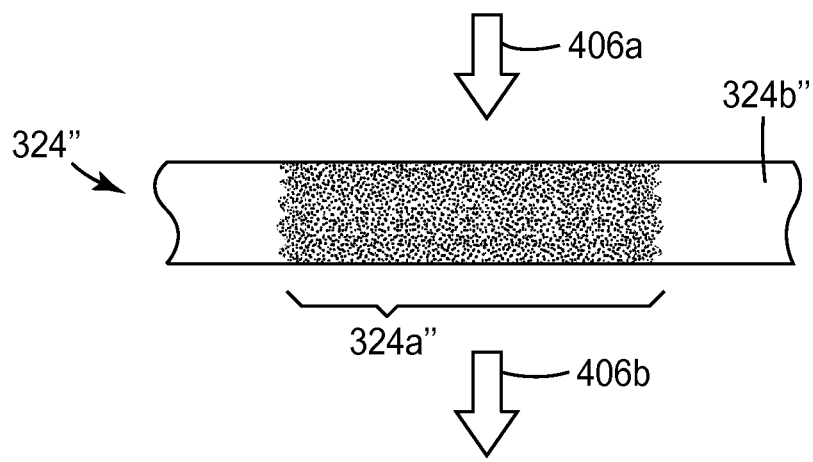
FIG. 4B is a similar view for an alternative embodiment of the indicia layer.

In FIG. 4B, a portion of an alternative indicia layer 324" is shown that may be the same as or similar to the indicia layer 324 in FIG. 3, and first and second portions 324a" and 324b" may likewise be the same as or similar to the first and second portions 324a, 324b, respectively, of FIG. 3. The first portion 324a" is shown shaded to indicate it blocks light to a greater extent than second portion 324b". However, the indicia layer 324" is tailored so that it is at least partially transmissive to light in both the first portions 324a" and the second portions 324b". This may be accomplished by using dyes, pigments, and/or inks in the indicia layer 324" at concentration levels that do not block all incident light. Such dyes, pigments, and/or inks may for example provide a spectrally neutral shade of gray that transmits light of all relevant wavelengths at a reduced but constant level. Alternatively, the dyes, pigments, and/or inks may be "colored", by selectively absorbing or reflecting some wavelengths and transmitting other wavelengths. Light transmission through the first and second portions 324a", 324b" is preferably sufficient, in view of the degree of spatial overlap between the indicia and the machine-readable pattern, so as to not unduly interfere with the detection and reliable deciphering of the machine-readable pattern, with little or no loss of information. Light transmission through the first portion 324a" is indicated in the figure by incident light 406a and transmitted light 406b.

Referring again to FIG. 3, the optical tag 320 also includes the contrast enhancing layer 326. In the construction of the optical tag, the layer 326 is typically disposed behind the patterned layer 322 from the perspective of an ordinary user or observer of the tag, and the layer 326 may also be disposed behind the indicia layer in some embodiments. The layer 326 is also configured to enhance the contrast of the pattern, e.g., as imaged by a camera or other suitable detection device. Retroreflective films are useful for this purpose. A retroreflective film has the characteristic of reflecting incident light, regardless of the angle of incidence on the film, back in the general direction towards the light source. Retroreflection can thus be used to increase brightness and contrast of an image of an optical tag when the optical tag is illuminated with a light source along an illumination axis that is parallel or nearly parallel to an observation axis of the camera or similar device that produces the image. Refer in this regard to the discussion of FIG. 1 above. A retroreflector disposed behind a specularly reflective patterned layer (the reflectivity and transmission of the patterned layer being functions of at least wavelength and position on the layer) can thus provide high contrast for optical tags imaged by a camera in close proximity to a flash light source, even when the camera defines an observation axis that is not orthogonal to the plane of the optical tag. The retroreflective strength of a retroreflective film is typically expressed in terms of candelas per lux per square meter. A retroreflective film used as a contrast enhancing layer may have any suitable retroreflectivity, e.g., at least 100 candelas per lux per square meter. Exemplary retroreflective films include those that have been sold or disclosed by 3M Company, including but not limited to 3M™ Scotchlite™ Reflective Material, 3M™ Engineer Grade Reflective Sheeting, 3M™ High Intensity Prismatic Sheeting, and 3M™ Diamond Grade™ Reflective Products. In some cases, retroreflectivity is provided in part by a layer of small transparent beads; in other cases, retroreflectivity is provided in part by a grooved or otherwise microstructured prismatic surface containing cube corner elements.

In some cases, as an alternative to a retroreflective film, the contrast enhancing layer 326 may be or include a diffusely reflective film. An ordinary white or colored sheet of paper may in some cases suffice, or a film or layer loaded with titanium dioxide particles or other scattering particles may also be used. The contrast enhancing layer 326 may also or alternatively be an absorptive film. For example, colored paper absorbs some visible wavelengths and reflects others. Alternatively, pigment-loaded coatings or inks may be used to enhance contrast. These coatings may be spatially uniform, or non-uniform (e.g. patterned).

The various layers shown in FIG. 3 can be combined in some cases. For example, indicia may be printed with a partially transparent ink or other suitable ink on a diffuse substrate such as a sheet of paper. In the resulting printed article, the layer(s) of ink may serve as an indicia layer 324, and the underlying sheet of paper may serve as the contrast enhancing layer 326.

The patterned layer 322, the indicia layer 324, and the contrast enhancing layer 326 may be attached to each other in any suitable fashion to form the optical tag 320, e.g., by laminating the layers together with optically clear adhesive(s) or with other suitable adhesives. Before describing some ways this may be carried out, we address some optical wavelength-related considerations.

Figure 5:
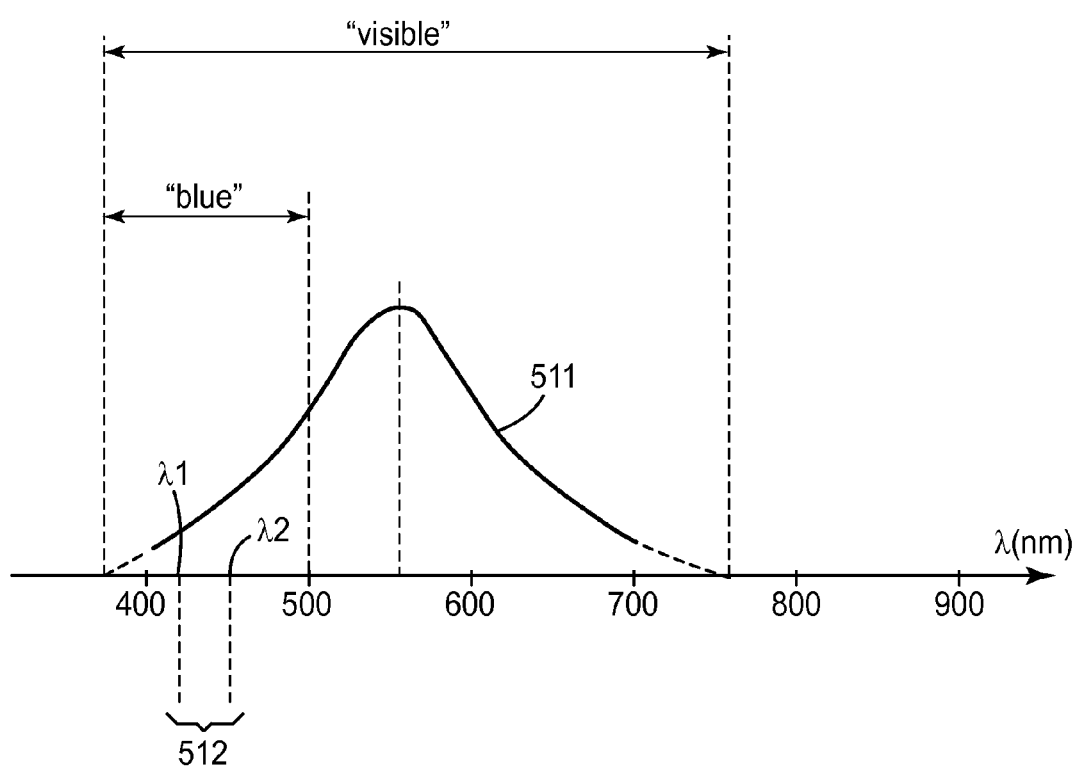
FIG. 5 is a schematic diagram of a portion of the electromagnetic spectrum, showing a possible spectral response curve for a human eye, and demonstrating ranges for visible light and for blue visible light as discussed herein.

In FIG. 5, a horizontal axis represents a portion of the electromagnetic spectrum, ranging from wavelengths less than 400 nm to wavelengths greater than 900 nm. A curve 511 represents an approximation of a possible spectral response curve for a human eye; note that this curve is only illustrative and is not necessarily intended to be the same as the standard photopic response. However, the curve has a maximum response at about 550 nm, i.e., for green visible light, and tapers off for longer and shorter wavelengths. The exact short and long wavelength limits of the human eye response can vary from person to person; for purposes of this application we assume a short wavelength limit of 380 nm and a long wavelength limit of 760 nm. Hence, for purposes of this application, we assume that visible light ranges from 380 to 760 nm.

Within this visible light range, a short wavelength end can be considered as "blue" visible light. In particular, we assume that the region of "blue" visible light extends from 380 to 500 nm. This region includes wavelengths that may considered various shades or hues of blue, e.g., indigo, violet, and blue-green.

As mentioned elsewhere, the patterned layer of at least some of the disclosed optical tags have first and second portions that define a machine-readable pattern, and the first portions selectively filter at least a portion of blue visible light from other visible light wavelengths. The selective filtering of the first portions may be accomplished using one or more reflection bands, absorption bands, or transmission bands of an optical film. The region 512 in FIG. 5 schematically represents a band which may be any of these bands. The region or band 512 has a left or short wavelength band edge at a wavelength of $\lambda 1$, and a right or long wavelength band edge at a wavelength $\lambda 2$. The values $\lambda 1, \lambda 2$ may be defined in any reasonable fashion, e.g., they may be the wavelengths at which the band has a value halfway between a baseline and a peak value. The so-called full-width-at-half-maximum (FWHM) of the band may thus be equal to $\lambda 2 - \lambda 1$. A transmission band or reflection band of a multilayer optical film is known to shift as a function of incidence angle; hence, unless otherwise noted, the band 512 may be assumed to be the position of the band for normally incident light.

The first portions of the patterned layer preferably filter at least a portion of blue visible light from other visible light wavelengths. The long wavelength band edge $\lambda 2$ may therefore be less than 500 nm, and in exemplary embodiments it may be no greater than 480 nm, or no greater than 440 nm. The short wavelength band edge $\lambda 1$ is less than $\lambda 2$. In some cases the short wavelength band edge $\lambda 1$ may still be within the blue visible region, but in other cases the band edge $\lambda 1$ may be an ultraviolet wavelength outside of the blue visible region, i.e., less than 380 nm.

There are several advantages to designing the patterned layer such that at least the long wavelength band edge $\lambda 2$ for the first portions falls within the blue region of the spectrum rather than at other wavelengths. First, by virtue of residing (at least partially) in the visible region, the band is capable of detection by ordinary cameras and similar detection devices that are designed for use over visible wavelengths. Second, the human eye's sensitivity decreases rapidly for wavelengths less than 500 nm, with particularly low sensitivity for visible blue wavelengths less than 480, 450, and 440 nm. Placing the long wavelength band edge $\lambda 2$ in the blue region can thus help to make the pattern of the patterned layer less conspicuous to ordinary observers. A third advantage relates to the fact that a reflection or transmission band of a multilayer optical film, depending on design details of the film, is typically also associated with higher order harmonics, e.g., reflection or transmission bands occurring at one-half, one-third, etc. of the wavelength of the fundamental or zero-order band. By placing the long wavelength band edge $\lambda 2$ of the fundamental band in the blue region, any harmonics of the fundamental band will fall in the ultraviolet region, which are not perceived by the human eye and will therefore not make the pattern more conspicuous. The same cannot be said if the long wavelength band edge of the fundamental band is placed in the near infrared region, e.g., at wavelengths greater than 760 nm. In that case, bands that are higher order harmonics of the fundamental band may fall within the visible region and contribute to conspicuity of the pattern. A fourth advantage relates to the fact that a reflection or transmission band of a multilayer optical film shifts to shorter wavelengths as the incident light becomes more oblique rather than normally incident on the film. By placing the long wavelength band edge $\lambda 2$ in the blue region, such a shift causes the band to move to wavelengths at which the human eye is even less responsive, which will therefore not make the pattern more conspicuous at the oblique angles.

The same cannot be said if the long wavelength band edge $\lambda 2$ is placed at a visible wavelength greater than 550 nm, e.g., at a red visible wavelength. In that case, the shift of the band causes the band to move to wavelengths at which the human eye is more responsive, causing the pattern to become more conspicuous at the oblique angles. A fifth advantage relates to compatibility with the typically strong emission in the blue region of the visible spectrum by white LED sources, which may be used as a flash source in detection devices such as mobile phones.

There are thus a number of reasons for designing the optical tag such that the first portions of the patterned layer selectively filter at least a portion of blue visible light from other visible light wavelengths. However, despite these reasons, alternative embodiments may also be made in which the first portions of the patterned layer selectively filter a different portion of light (other than blue visible light) from other light wavelengths. For example, the band associated with such first portions may have a short wavelength band edge (for normal indicence) of no less than 630 nm, or of no less than 950 nm. If the band is substantially entirely outside the visible region, the camera or other detection device that images the inconspicuous pattern should be configured so that its response is not limited to only visible wavelengths, but also includes wavelengths within the band.

Figure 6:
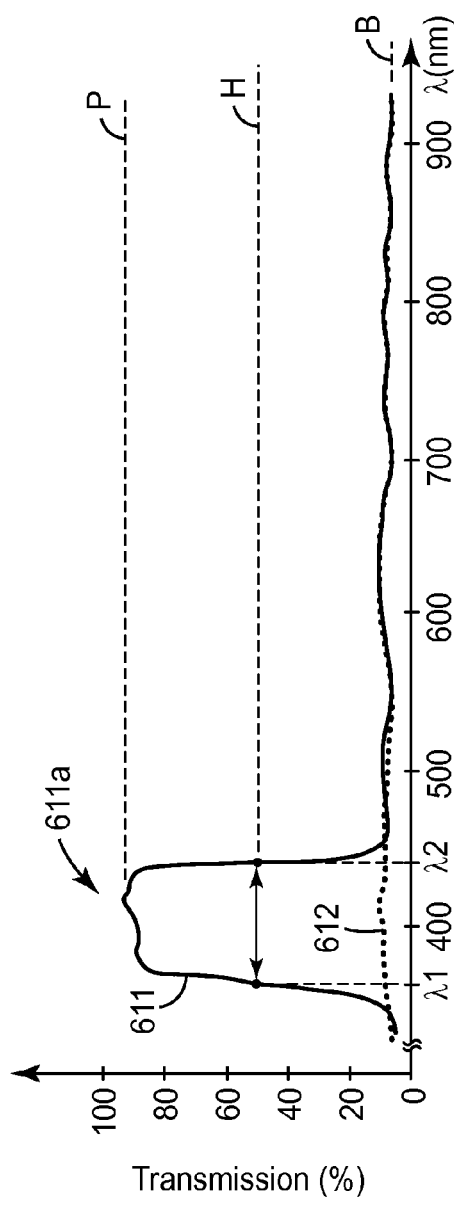
FIG. 6 is a graph of spectral transmission for a hypothetical patterned layer, with one curve representing the spectral transmission of first portions of the hypothetical layer (the first portions selectively filtering at least a portion of blue visible light from other visible wavelengths), and another curve representing the spectral transmission of second portions of the hypothetical layer (the second portions providing relatively little or no such filtering of the portion of blue visible light)
Figure 7:
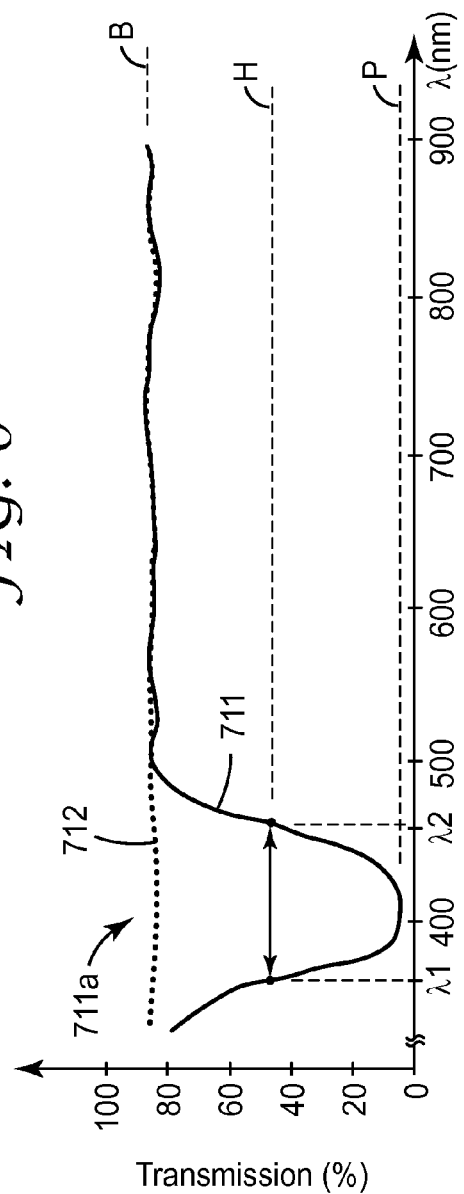
FIG. 7 is a graph similar to FIG. 6, but for an alternative hypothetical patterned layer.

FIGS. 6 and 7 are provided for illustrative purposes, and show graphs of possible spectral transmission of hypothetical patterned layers used to make the inconspicuous pattern. These graphs at least roughly correspond to patterned multilayer optical films that can be made using the spatially selective birefringence reduction techniques described in the '357 Merrill et al., '363 Merrill et al., and '373 Merrill et al. references mentioned above. In FIG. 6, curve 611 represents the spectral transmission of first portions of the hypothetical patterned layer, and curve 612 represents the spectral transmission of second portions of such patterned layer. The first portions have a low transmission (and correspondingly high reflectivity) for light outside of a transmission band 611a, and have a high transmission (and low reflectivity) for light inside the transmission band 611a. The transmission band 611a may be characterized by a peak value P, a baseline value B, an intermediate value H halfway between P and B, and short and long wavelength band edges $\lambda 1$ and $\lambda 2$ respectively associated with the intermediate value H. The long wavelength band edge $\lambda 2$ is in the blue visible region and less than 500 nm. The short wavelength band edge $\lambda 1$ may be in the ultraviolet region outside of the visible region, or it may be within the (blue) visible region. The first portions selectively filter at least a portion of blue visible light from other visible wavelengths. In contrast, as can be seen by the curve 612, the second portions provide relatively little or no such filtering of the portion of blue visible light.

In FIG. 7, curve 711 represents the spectral transmission of first portions of an alternative hypothetical patterned layer, and curve 712 represents the spectral transmission of second portions of such alternative patterned layer. The first portions have a high transmission (and correspondingly low reflectivity) for light outside of a reflection band 711a, and have a low transmission (and high reflectivity) for light inside the reflection band 711a. The reflection band 711a may be characterized by a peak value P, a baseline value B, an intermediate value H halfway between P and B, and short and long wavelength band edges $\lambda 1$ and $\lambda 2$ respectively associated with the intermediate value H. The long wavelength band edge $\lambda 2$ is in the blue visible region and less than 500 nm. The short wavelength band edge $\lambda 1$ may be in the ultraviolet region outside of the visible region, or it may be within the (blue) visible region. The first portions selectively filter at least a portion of blue visible light from other visible wavelengths. In contrast, as can be seen by the curve 712, the second portions provide relatively little or no such filtering of the portion of blue visible light.

Figure 9:
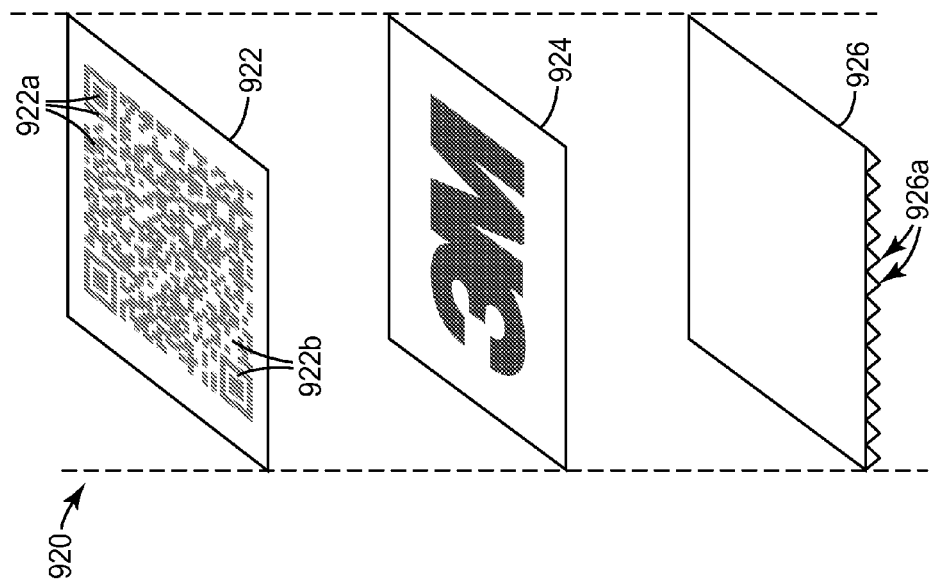
FIG. 9 is a schematic exploded view of an optical tag in which an indicia layer is disposed between a patterned layer and a contrast enhancing layer.
Figure 8:
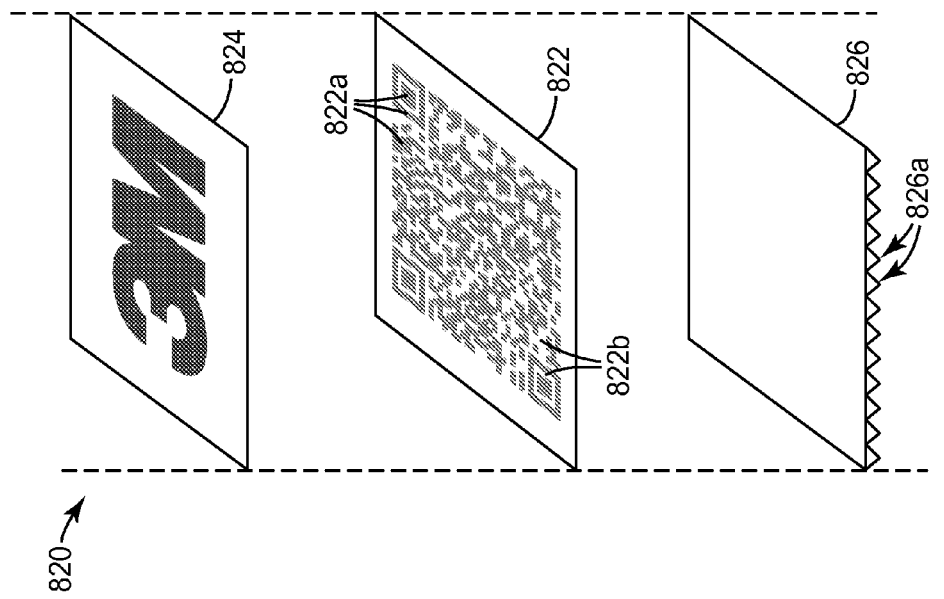
FIG. 8 is a schematic exploded view of an optical tag in which a patterned layer is disposed between an indicia layer and a contrast enhancing layer.

FIGS. 8 and 9 provide schematic exploded views that demonstrate different ways in which the patterned layer, indicia layer, and contrast enhancing layer (refer e.g. to the discussion above in connection with FIG. 3) can be arranged and joined together to form an optical tag. In FIG. 8, an optical tag 820 includes a patterned layer 822, an indicia layer 824, and a contrast enhancing layer 826. These layers may be the same as or similar to corresponding patterned layers, indicia layers, and contrast enhancing layers discussed elsewhere herein. The patterned layer 822 has an inconspicuous pattern, shown schematically as a QR Code, defined by first portions 822a and second portions 822b. The first portions may selectively filter at least a portion of blue visible light from other visible light wavelengths. The indicia layer 824 may have first and second portions defining an indicia, in this case a "3M" logo. The indicia layer 824 is disposed to overlap the inconspicuous pattern so as to mark a location of the pattern. The contrast enhancing layer 826 is disposed behind the patterned layer 822, and is configured to enhance a contrast of the pattern. In this case, the contrast enhancing layer 826 is shown as having a structured surface with an array of cube corner prisms 826a, such that the contrast enhancing layer is retroreflective. In the optical tag 820 of FIG. 8, the patterned layer 822 is disposed between the indicia layer 824 and the contrast enhancing layer 826. In one exemplary embodiment, the first portions 822a selectively transmit a portion of blue visible light but substantially reflect other visible light wavelengths, and the second portions 822b substantially reflect substantially all visible light wavelengths. An image of such an embodiment taken with a flash-equipped camera will contain a blue-enhanced image of the QR Code pattern in layer 822.

In FIG. 9, an optical tag 920 includes a patterned layer 922, an indicia layer 924, and a contrast enhancing layer 926. These layers may be the same as or similar to the corresponding patterned layer 822, indicia layer 824, and contrast enhancing layer 826 of FIG. 8, and first and second portions 922a, 922b may correspond to first and second portions 822a, 822b, and cube corner prisms 926a may correspond to cube corner prisms 826a. However, in the optical tag 920 of FIG. 9, the indicia layer 924 is disposed between the patterned layer 922 and the contrast enhancing layer 926. Furthermore, in an exemplary embodiment, the first portions 922a selectively reflect a portion of blue visible light but substantially transmit other visible light wavelengths, and the second portions 922b substantially transmit substantially all visible light wavelengths. An image of such an embodiment taken with a flash-equipped camera will contain a blue-deficient image of the QR Code pattern in layer 922, the image of the pattern being deficient in blue light due to the selective blue reflectivity of the first portions 922a, which prevents the blue light from reaching the contrast enhancing layer 926 and hence also from reaching the camera.

Regardless of the placement of the patterned layer relative to other layers of the optical tag, the selective filtering (of e.g. at least a portion of blue visible light from other visible wavelengths) of the first portions of the patterned layer may be satisfied by a large, medium, or, in some cases, a relatively small change in an optical property such as reflection, transmission, or absorption, for the selected (e.g.) blue light relative to other visible wavelengths. In this regard, the reflection, transmission, and/or absorption in a relevant spectral region (e.g. blue visible wavelengths or other visible or non-visible wavelengths) and for a relevant portion of the patterned film (e.g. first portions or second portions of the patterned film) need not be particularly high such as near 100% nor particularly low such as near 0%, but may be at an intermediate value such as in a range from roughly 30-70%. For example, the patterned layer of FIG. 8, FIG. 9, or of other disclosed optical tags may be or comprise a partial reflector that partially reflects and partially transmits over all visible wavelengths in first and second portions thereof, except that in the first portions the reflection increases (or decreases) a substantial amount for at least a portion of blue visible light relative to other wavelengths. The substantial amount of increase (or decrease) in reflectivity may depend on design details of the optical tag, but in some cases may be e.g. 10% or more, or 20% or more, or 30% or more.

We will now discuss how an image of the optical tag, after being obtained with the use of a camera or other suitable detection device (including in particular handheld or otherwise mobile electronic devices), can be processed in order to automatically read or decipher information contained in the inconspicuous pattern. The image processing can take advantage of the selective wavelength filtering associated with the patterned layer. For example, when the first portions of the patterned layer are tailored to selectively filter at least a portion of blue visible light from other visible wavelengths, the information contained in the inconspicuous pattern will be concentrated primarily in blue color components of a full-color image, rather than, e.g., red or green color components of the full-color image. Refer in this regard to the discussion of FIGS. 8 and 9 above. By isolating the blue color components, a monochrome image can be obtained from which the pattern information can be more easily read or deciphered.

Figure 10:
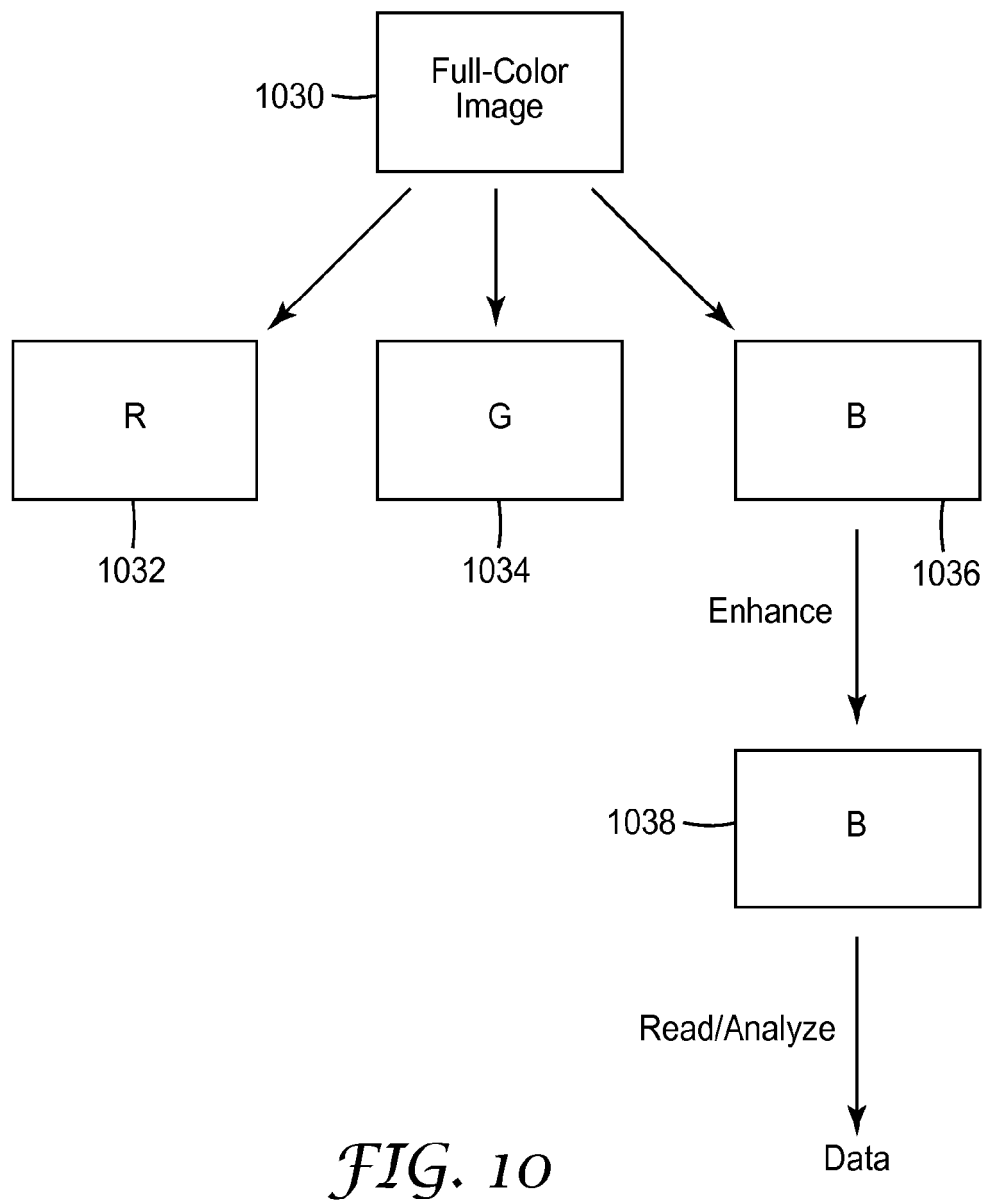
FIG. 10 is a schematic diagram illustrating how blue color components of a full-color image can be isolated in order to obtain data from an inconspicuous machine-readable pattern.

FIG. 10 illustrates an exemplary method of obtaining machine-readable information or other information from a full-color image of a disclosed optical tag. The tag is assumed to include a patterned layer having first portions that selectively filter at least a portion of blue visible light from other visible wavelengths. A full-color image 1030 of the tag is assumed to be obtained using a camera or other suitable detection device, e.g., a standard camera provided on a conventional smart phone, in a setup which may be similar to that of FIG. 1. The full-color image is made up of a large array of discrete pixel elements or "pixels". Each pixel, in turn, comprises individual color components, the synthesis of which provides an image perceived to be "full-color". Commonly, each pixel is made up of three color components: a red component, a green component, and a blue component, which may represent the brightness of red light, green light, and blue light respectively for that pixel. The full-color image 1030 may thus be considered to be the combination or synthesis of three monochrome images: a red monochrome image 1032, which is made up of the red components of the pixels in the original image 1030; a green monochrome image 1034, which is made up of the green components of the pixels in the original image 1030; and a blue monochrome image 1036, which is made up of the blue components of the pixels in the original image 1030.

As part of our image processing of the image of the optical tag, we isolate the blue monochrome image 1036 from the full-color image 1030. This blue monochrome image can be expected to contain the highest contrast representation of the pattern in the patterned layer due to the selective blue filtering of the pertinent portions of the patterned layer. Accordingly, the blue monochrome image 1036 can provide enhanced detection of the pattern relative to the full-color image 1030.

The reader will understand that if the patterned layer in the optical tag is designed to selectively filter optical wavelengths other than a portion of blue visible light, e.g., red visible light or near infrared light, substantially similar procedures as those described herein for blue visible light can be employed so as to isolate a "single color component" monochrome image.

After isolating the blue monochrome image 1036 (or other single color component monochrome image), the isolated image can be further enhanced using a variety of image processing techniques. These techniques include one or more of averaging, smoothing, interpolation, sharpening, background subtraction, thresholding, edge detection, low-pass filtering, high-pass filtering, error correction, spike reduction, blob detection, and/or contrast enhancement. The blue monochrome image 1036 is typically comprised of an array of pixels, with each pixel having a grayscale value. The grayscale value may be bracketed by a lower and upper limit, e.g., the grayscale value for each pixel may be in a range from a lower limit of 0 (which may be defined as "black", or zero intensity of blue light) to an upper limit of 255 (which may be defined as "white", or maximum intensity of blue light). Averaging or "smoothing" techniques are used to reduce image "noise." One "smoothing" approach involves replacing each pixel value with the averaged grayscale value for a matrix of pixels centered about the target pixel. Alternate "smoothing" algorithms involve convolution routines with Gaussian filters. Alternatively, the pattern contrast may be enhanced by sharpening. Sharpening techniques involve replacing each pixel value with a weighted average grayscale value for a matrix of pixels centered about the target pixel. Alternately, the pattern contrast may be enhanced by subtracting the image background. One exemplary approach for subtracting an image background is referred to as the "rolling ball" algorithm. See in this regard the article "Biomedical Image Processing" by Stanley Sternberg in IEEE Computer (January 1983), pp. 22-34. Alternatively or in addition, pattern contrast may be enhanced by thresholding. Thresholding converts the grayscale image to a binary image through appropriate selection of a grayscale value, the "threshold". Pixels with grayscale values below the threshold are converted to "black" (0), and pixels with grayscale values above the threshold are converted to "white" (255). Alternatively, the pattern contrast may be enhanced utilizing edge finding algorithms. A Sobel edge filter is one exemplary approach for locating edges. The Sobel technique determines the gradient of image intensity at each pixel to determine the location of edges.

The image processing techniques discussed here are not intended to be limiting and any number of approaches common to computer vision may be applied. In addition, these algorithms may be combined or used separately to process the image into a machine readable code.

The image processing techniques are preferably carried out so as to provide a resulting processed image 1038 which can be readily read or analyzed to ascertain the information or data contained in the pattern. In some embodiments the information may be digital in form, e.g. the pattern in the patterned layer may be composed of discrete stripes or blocks of uniform or otherwise predetermined size or shape, such as are found in 1-D or 2-D bar codes. Also, the image processing techniques may be carried out in one or more software applications ("apps") that can be installed in a mobile phone, camera, or other detection device used to image the optical tag. However, the image processing techniques may alternatively be carried out on other devices, including devices that are not mobile or portable.

1-D and 2-D bar codes can be read or analyzed using software routines specifically tailored to the particular type of bar code. These readers are typically available as software applications ("apps") that can be used on mobile computing platforms, exemplary mobile computing platforms include iOS (Apple Inc., Cupertino Calif.) and Android (Google, Mountain View Calif.). Exemplary "apps" capable of decoding 1-D and/or 2-D bar codes include QR Reader (available from TapMedia, London England) and i-nigma (available from 3GVision, Or Yehuda, Israel). A QR Code or "Quick Response" Code is a type or class of 2-D bar code that is commonly used to digitally encode information in a physical article. In cases where the processed image 1038 is or includes a QR Code or the like, the code or pattern may be decoded, deciphered, or read by a software routine that analyzes the processed image 1038 to locate the "finder pattern", which is comprised of three "position detection patterns". Each "position detection pattern" is comprised of three superimposed concentric squares: a 3×3 black square, a 5×5 white square, and a 7×7 black square. These "position detection patterns" define the location and orientation of the QR code. Once the location and orientation of the QR code is defined, the information is decoded according the specifications defined in the International Standard ISO/IEC 18004. The foregoing description, which is not intended to be limiting, is exemplary for the case of QR Codes but could be modified for or adapted to other patterns, including 1-D and other 2-D bar codes.

Various modifications can be made to enhance or add functionality to the disclosed optical tags and their associated systems and methods. In this regard, the indicia layer of any of the embodiments may be or comprise a machine readable pattern such as a 1-D or 2-D bar code. Such an indicia layer may provide a visible or conspicuous machine readable (bar) code that does not significantly interfere with the detection and reading of the inconspicuous pattern (which may be a different 1-D or 2-D bar code) of the patterned layer. For example, the conspicuous pattern of the indicia layer may be a green channel bar code, or a suitably half-toned bar code. In this manner, two separate functional codes (one provided by the conspicuous pattern of the indicia layer, the other provided by the inconspicuous pattern of the patterned layer) can overlay the same physical space. In some cases, the inconspicuous code can function as a covert feature, e.g. for security or business purposes. In some cases, the two codes can work cooperatively, e.g. the two codes when combined create a completed code or an additional code. In some formulations, the codes when subtracted create a completed code. This completed code could then provide additional information or functionality. In this manner, the inconspicuous code may function as key (e.g. an encryption key) for the conspicuous code. In some cases, it may be advantageous to use a wavelength band not typically readable by an ordinary viewing device, e.g. a near infrared wavelength band or channel. Multiple coding with three or more levels of encoded patterns may also be used. For example, the indicia layer may provide a conspicuous green-colored pattern (a first machine-readable code), and the patterned layer may provide an inconspicuous pattern based on selective filtering of at least a portion of blue visible light (a second machine-readable code), and still another layer in the optical tag may provide a second inconspicuous pattern based on selective filtering of infrared or near-infrared light (a third machine-readable code).

EXAMPLES

Example 1

Figure 11A:
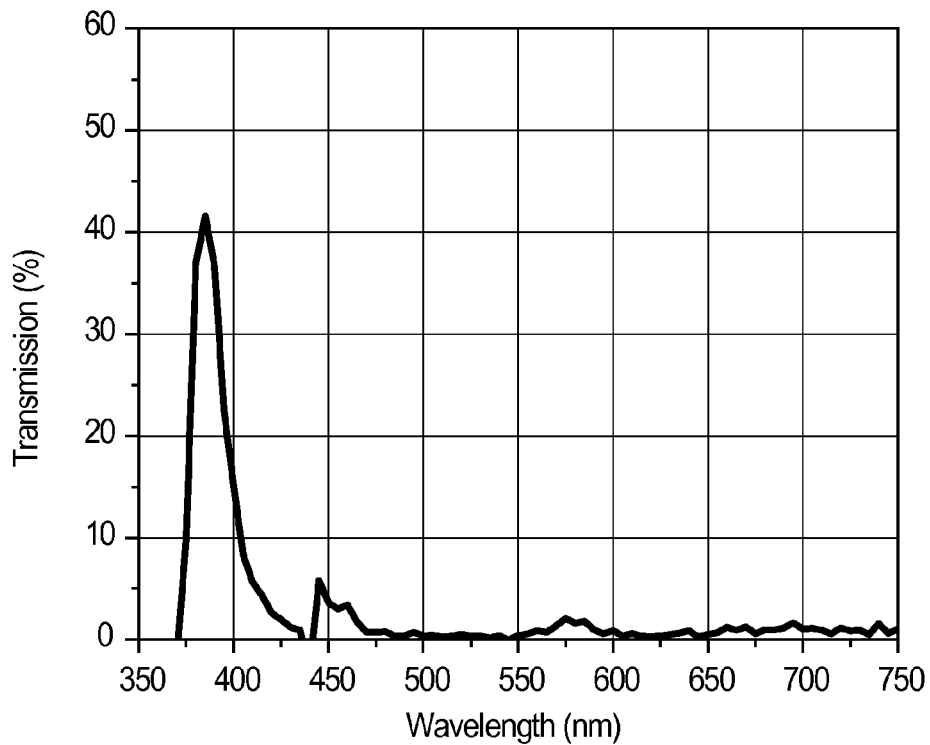
FIGS. 11A and 11B are graphs of the measured spectral transmission of different portions of a broadband reflective multilayer optical film that was fabricated and used as a patterned layer in an optical tag.
Figure 11B:
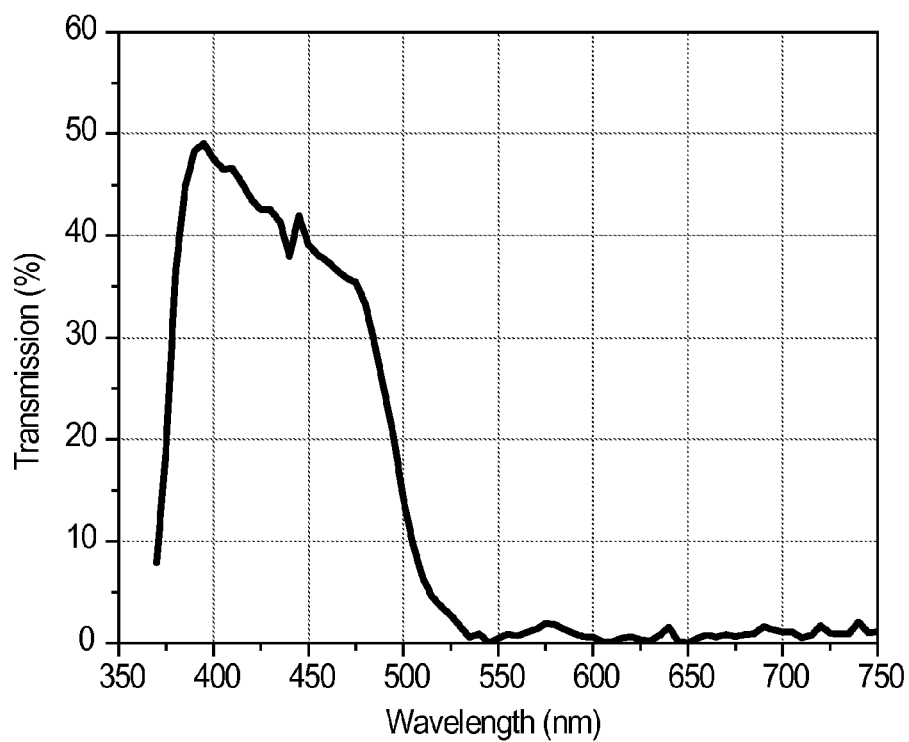

An optical tag having a concealed pattern was prepared as follows. A commercially available multilayer optical film, known as Vikuiti™ Enhanced Specular Reflector Film 2 (ESR2) from 3M Company, was obtained. This film, referred to here as Film A, has a broadband reflectivity, with a high reflectivity (and corresponding low transmission) throughout almost all of the visible wavelength range. The spectral transmission of this Film A at normal incidence is shown in FIG. 11A. The Film A was then pattern-wise heat treated by judiciously delivering an appropriate amount of energy to selected portions of the film on one side of the film, which produced a relaxation of birefringence in some of the material layers, and an accompanying change in optical properties. (In this regard, principles of heat-induced birefringence relaxation in multilayer optical films are discussed in the '357 Merrill et al., '363 Merrill et al., and '373 Merrill et al. references mentioned above.) The resulting pattern-wise heat treated film is referred to here as Film B. The pattern-wise heat treatment was in the shape or pattern of a QR Code. Heat-treated areas are referred to here as first portions of the Film B, and areas of Film B that were not heat-treated are referred to here as second portions. The non-heat-treated second portions of Film B have the transmission characteristics of FIG. 11A. Reflection characteristics of the second portions can be ascertained from FIG. 11A using the relationship transmission+reflection≈100%, except that deviations from this relationship occur at ultraviolet wavelengths where the polymer materials of the film can exhibit non-negligible absorption. The heat-treated first portions of Film B were also measured for spectral transmission at normal incidence, and the result is shown in FIG. 11B. Reflection characteristics of the first portions can be ascertained from FIG. 11B in the same way as explained above in connection with FIG. 11A. The transmission band that can be seen at the left side of FIG. 11B has a long wavelength band edge at about 490 nm.

An ink receptive coating solution was prepared by mixing polyvinyl alcohol (PVA) with fumed silica Cab-O-Sperse (available from Cabot Corp., Billerica Mass.). The coating was prepared as described in WO 2012/054320 (Coggio et al.). The final solution was 10% solids with a resin-to-silica ratio of 1:4. This solution was then coated onto a side of Film B designated the front side. The solution coating on Film B was done with a wire wound rod (available from R.D. Specialties, Webster N.Y.). Then the coating was air dried at room temperature for two to three minutes, and further dried in a forced air convection oven set to 60° C. for 3-5 minutes. The final thickness of the coating layer was approximately 7 microns.

An indicia graphic showing the symbols "3M" was prepared by designing a composite image consisting of printed regions and null regions. The null regions consisted of a linear array of dots covering 20% of the image area. This indicia graphic was then printed onto the ink receptive coating on Film B using an HP Photosmart C5180 printer with the "fast" print quality setting. The printing was done in such a way that the "3M" indicia was partially superimposed on the QR Code pattern.

A structured retroreflective film was then hand laminated to a back side (opposite the front side) of the Film B. This lamination was done using 3M™ Optically Clear Adhesive 8171, available from 3M Company, to bond the retroreflective film to the back side of Film B, with the "3M" indicia having already been printed on the opposite side. The retroreflective film, which functioned as a contrast enhancing layer, utilized a prismatic structured surface and was substantially as described in paragraphs 0073-0076 of WO 2011/129832 (Free et al.). After lamination of the retroreflective film to the back side of Film B, the resulting construction is referred to here as Optical Tag 1.

FIG. 12A shows the Optical Tag 1 imaged using an iPhone 4 (available from Apple Inc., Cupertino Calif.) under ambient lighting conditions, with the flash disabled. FIG. 12B shows the Optical Tag 1 imaged using the iPhone 4 but with its LED flash enabled. FIGS. 12A and 12B are both grayscale versions of full-color images generated by the iPhone4. To improve the grayscale contrast of the image, the blue component of the full-color image of FIG. 12B was isolated from the other color components using ImageJ software (available from National Institutes of Health, Bethesda Md.); the resulting blue monochrome image is shown in FIG. 12C. Additional image processing was then performed on the image of FIG. 12C to further enhance the contrast and readability of the QR Code pattern, and to isolate the QR Code pattern from the remainder of the image. First, the image background was subtracted using a rolling ball radius of 50 pixels. Second, the image was converted to a binary image by applying a threshold. The threshold parameters were chosen such that pixels with values between 88 and 255 (on a scale of 0 to 255) were set to black and the remaining pixels were set to white. FIG. 12D shows the resulting enhanced and isolated QR Code pattern obtained from the image of FIG. 12C. The processed image of FIG. 12D was determined to be machine readable using the i-nigma QR Code reader (available from 3GVision, Or Yehuda, Israel).

Example 2

A spatially tailorable optical film, which functioned as a patterned layer for this Example 2, was made as described generally in WO 2010/075357 (Merrill et al.) from a blue-reflecting multilayer optical film, which is referred to here as Film C. Film C was formed by co-extrusion of approximately 300 alternating layers of two polymeric materials, one containing an infrared absorbing dye of chosen concentration, casting the extrudate into a quenched web, and stretching this cast web biaxially to form the blue-reflecting Film C.

To make Film C, a 90/10 mol % first copolymer of PEN and PET sub-unit (comprising 90 mol % naphthalene dicarboxylate, 10 mol % terephthalate as the carboxylates of Example 1 of U.S. Pat. No. 6,352,761 (Hebrink et al.)), was used for the high index optical layers. A 70%/30% weight mixture of 55/45 HD coPEN second copolymer (as described in Example 10 of U.S. Pat. No. 6,352,761 (Hebrink et al.)), and third copolymer Eastar™ GN071 Copolyester (available from Eastman Chemicals, Kingsport Tenn. USA) were used for the low index optical layers. These second and third copolymers transesterified in situ at 280° C. in the extruder and melt train to form a single, optically clear copolymer in the low index optics streams. A master batch comprising 1 wt % Amaplast IR-1050 infrared absorbing dye (available from ColorChem, Atlanta Ga.) was formed by milling a suspension of the Amaplast in ethylene glycol with a Solplus D540 surfactant (available from Lubrizol, Cleveland Ohio) and adding this suspension to the reactor vessel to make the 90/10 coPEN polymer dye-loaded master batch. The master batch was introduced into the high index optics 90/10 coPEN resin feed stream for the co-extrusion process in the weight proportion of 1:3 to the pure copolymer. The coPEN was combined into approximately 150 high index layers alternating with another approximately 150 layers of the 70%/30% mixture of the transesterified product of the second and third copolymer in the low index layers, these optical layers comprising high and low index material in the weight proportion of about 9:10. The outer layers of the coextruded layers within the feed block were protective boundary layers (PBLs) comprising the transesterified mixture of the second and third copolymers. These approximately 300 layers formed an optical packet. The PBLs were about 15 wt % of the total flow of this optical packet. A final co-extruded pair of skin layers, comprising 90/10 coPEN, was co-extruded in a total weight proportion of about 6:5 to the optical packet. The extruded web was quenched, heated above the glass transition temperature of the first copolymer, stretched over rollers in a length orienter to a draw ratio of about 3.9, and then heated to approximately 125° C. and stretched transversely to a draw ratio of about 4 in a tenter. The film was heat set at about 238° C. after stretching and wound into a roll of film. The resulting optical Film C was approximately 37 microns thick.

A section of Film C was selected that was nearly clear (had the appearance of being nearly completely transparent) and had low color. This section was hand-coated on both sides with 3M™ Optically Clear Adhesive 8171 (see above) and hand-laminated on both sides with 100 micron thick clear 3M polycarbonate security film (also available from 3M Company). The construction was then pressed in a Carver hydraulic platen press (available from Fred S. Carver Inc., Wabash, Ind.), for 2100 seconds, at 171° C., and with a pressure of 288 kPa to secure Film C in a lamination between the polycarbonate security films, the laminate having an overall thickness of approximately 275 microns. The resulting lamination, which is referred to here as Lamination D, had only a very slight dark and yellow hue in transmission, and a slight violet hue in reflection when viewed at a normal angle, these characteristics being attributable to the optical properties of Film C within Lamination D.

Figure 13:
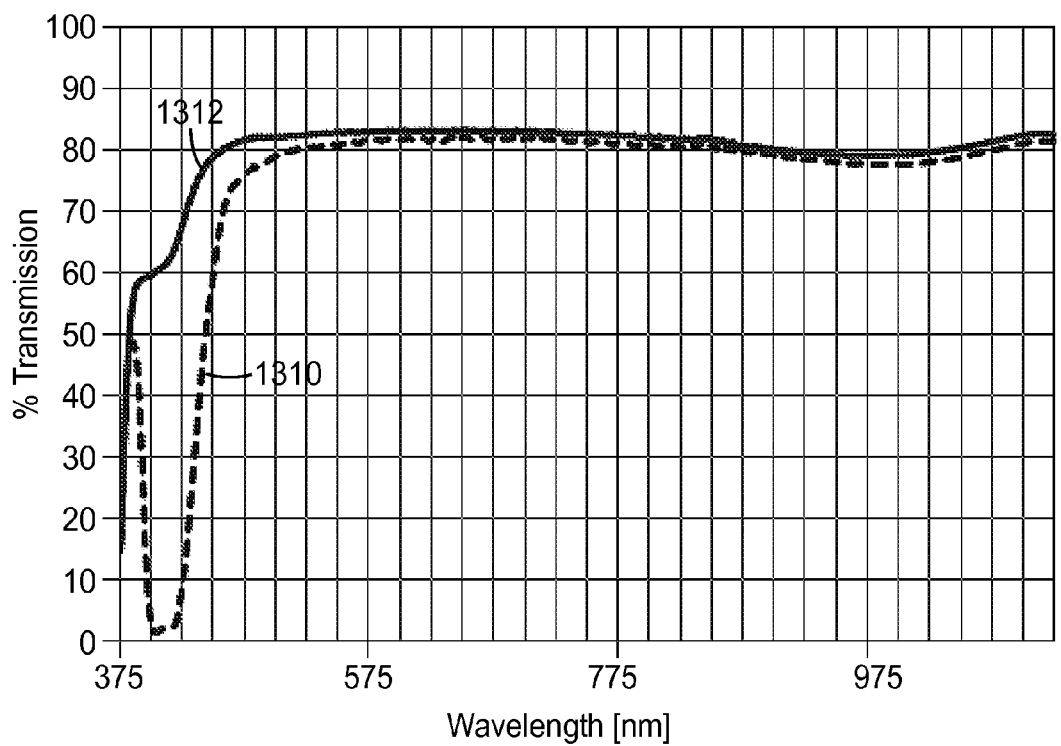
FIG. 13 is a graph showing the measured spectral transmission (for normally incident light) of different portions of a broadband transmissive multilayer optical film that was fabricated and used as a patterned layer in an optical tag.

The spectral transmission of Lamination D was measured using a spectrophotometer (Lambda 950 spectrophotometer available from Perkin-Elmer, Waltham Mass.). A typical measured spectrum is presented as curve 1310 of FIG. 13. Because of inherent absorption by the polymers below about 380 nm, the transmission dropped at the shorter wavelengths. Surface reflections from the two outer major surfaces of the Lamination D reduced the measured total transmission well below 100%. Minor visible absorption from the IR-absorbing dye in the visible region further suppressed this baseline. Curve 1310 was measured using unpolarized light, resulting in an average transmission between the two principal polarization states of the incident light as would be typical for a cell phone camera without a polarizing filter. As is evident from FIG. 13, the transmission baseline (refer e.g. to baseline value B in FIG. 6) including these surface reflections was around 82% in the green and red regions of the spectrum. The band edges can be defined, in one typical measure, as the edges of the reflection peak (transmission well), typically taken as 50% of the difference between the baseline value and the average band residual transmission over a relevant central portion. The residual transmission through the central portion of this band was about 4% (refer e.g. to peak value P in FIG. 6). Given the uncertainties of the baseline extrapolated into the blue, the short and long band edges ($\lambda 1$ and $\lambda 2$ respectively) of the Film C (and of Lamination D) were thus approximately 385 nm and 445 nm, respectively.

Lamination D was placed upon a mirror-finished metallic plate, and both the plate and Lamination D were positioned on a vacuum stage available from Thorlabs-Inc., Newton, N.J., to tautly secure the Lamination D against the plate surface. Lamination D was then exposed to radiation from a 20W pulsed fiber laser (manufactured by SPI Lasers, Southhampton, UK) with a wavelength of 1064 nm so as to be selectively patterned by a hurrySCAN//14 galvanometer scanner (SCANLAB AG, Puccheim, DE) and focused by an f-theta lens designed for 1064 nm (Sill Optics GmbH, Wendelstein, DE). The exposure pattern corresponded to that of a black rectangle in the control graphic of size 30 cm×25 cm and a machine-readable QR code, of size 30 cm×30 cm so as to be separated by 40 cm in a down web lane (so that the two elements of the pattern lie in the same cross-section of Film C's co-extrusion.) Both patterns were raster-scanned images, arranged so that the image was pixelated where each pixel was a pulse of the laser and the pixel's grayscale value was linearly matched to a power output of the fiber laser. As such, the maximum average laser power value corresponding to black in the grayscale was set to 6.5 W as measured by a thermopile sensor (LabMax-TOP, Coherent, Inc., Santa Clara, Calif.). Further conditions of processing were a pulse repetition rate of 500,000 Hz, a pulse duration of 9 ns, and a pixel lineal density of 400 dots per inch (dpi) in a single direction scan mode. By "single direction scan mode" is meant that the laser's beam started at the top left corner of the pattern; it proceeded in a linear path to the furthest right edge of the pattern; the laser power was set to zero until the scanner was set back to the left edge just below the last scan; then the laser power was turned back on so as to continually proceed in the same way until the entire pattern was completed. The lineal pixel density thus represented both the scan direction and the orthogonal direction. To reduce the tendency toward surface defects such as charring and delamination, the stage was set so that the contact surface of the metal plate and Lamination D was approximately 5.5 mm in front of the focal point of the f-theta lens, giving an effective laser beam diameter of approximately 130 microns. With the lineal pixel density leaving approximately 63.5 microns between each pixel in both directions, all exposed areas were nearly quadruple pulsed by overlap, effectively exposing the entire surface area within each pattern. As a result, the rectangle pattern optically represented the condition of the black areas of the QR Code pattern with sufficient area so as to be measured spectrally by a device such as a Lambda 950 spectrophotometer. This measurement of spectral transmission of the laser-treated areas of the Lamination D is presented as curve 1312 in FIG. 13. The portion of Lamination D disposed between the two patterns, which portion was not laser-treated, was used to measure the curve 1310 referenced above. The Lamination D after the patterned laser treatment is hereinafter referred to as Lamination E, which may be considered a patterned layer. Curve 1310 may represent first portions of the patterned layer, since these portions selectively filter at least a portion of blue visible light from other visible light wavelengths. Curve 1312 may represent second portions of the patterned layer, since these portions do not selectively filter the portion of blue visible light, to the extent the first portions do.

Figure 14:
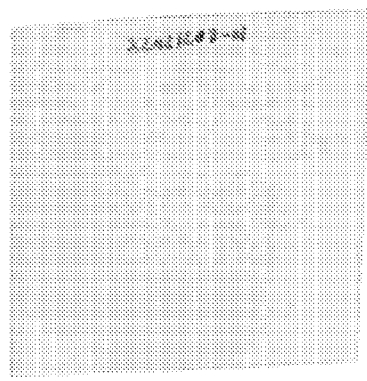
FIGS. 14 through 19 are images of the patterned layer of FIG. 13 in combination with other components.
Figure 15:
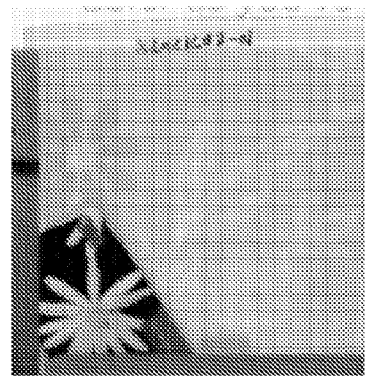

As a result of the laser treatment, the Lamination E exhibited a qualitatively inconspicuous pattern wherein the very slight yellow transmission color at normal incidence (and the very slight violet reflection at normal incidence) was mostly erased at locations that had been laser treated (corresponding to "black" pixels of the control patterns). This low conspicuity was demonstrated by taking a simple digital scan of the Lamination E using a standard copying/printer device, resulting in the images shown in FIGS. 14 and 15. In FIG. 14, a piece of white paper was placed behind (from the perspective of the copying/printer device) the Lamination E. In FIG. 15, a non-uniform printed graphic sheet, rather than the piece of white paper, was placed behind the Lamination E. In the views of FIGS. 14 and 15, the QR Code pattern that was imparted to the Lamination E by the laser treatment is almost imperceptible. In the construction of FIG. 14 (Lamination E disposed in front of white paper), the QR Code was inconspicuous but discernable as an extremely faint pattern. In the construction of FIG. 15 (Lamination E disposed in front of non-uniform printed graphic sheet), the QR Code was greatly obscured, and close inspection was needed to detect it.

Machine readability of the QR Code pattern in Lamination E can be appreciated by comparison of curves 1310, 1312 at certain blue visible wavelengths. At 410 nm, for example, the first portions (curve 1310) have a transmission of approximately 2%, whereas the second portions (curve 1312) have a transmission at 410 nm of approximately 61%. These differences in transmission (or reflection) can be exploited in an optical tag construction to provide sufficient contrast, at least for blue color components of a full-color image from a camera or the like, so that the inconspicuous pattern can be detected e.g. through the use of an imaging algorithm.

Figure 16:
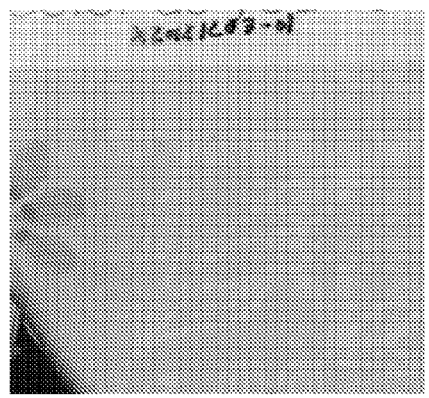
Figure 17:
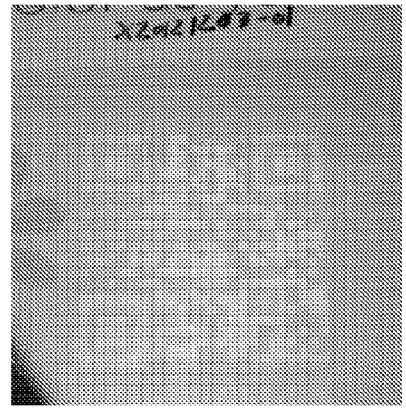
Figure 18:
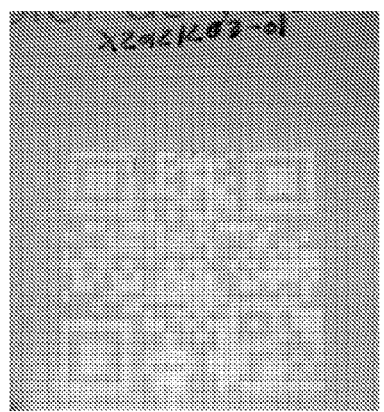
Figure 19:

Machine readability of the QR code was also demonstrated by viewing the combination of Lamination E, with its inconspicuous QR Code pattern, in front of a backing of a diffuse white piece of stiff paper or cardboard on the front surface of which indicia was printed. This combination was viewed and imaged with an iPhone 4 smart phone, available from Apple Inc., Cupertino Calif. Using this device, the image of FIG. 16 was taken in ambient lighting without a flash, and the image of FIG. 17 was taken with the flash. FIGS. 16 and 17 are both grayscale versions of full-color images generated by the iPhone4. FIG. 18 shows an image of the blue component of the image of FIG. 17, isolated from the other color components using the ImageJ software (see above). The image of FIG. 19 shows the machine readable QR Code pattern, present in the Lamination E of the combination. The image of FIG. 19 was created as follows. Three processing steps were applied to the image of FIG. 18. First, a smoothing routine from ImageJ was applied; this routine replaced each pixel value with an averaged grayscale value for a 3×3 matrix of neighboring pixels. Second, a rolling ball background subtraction was applied using a rolling ball radius of 50 pixels. (This followed an approach described by Sternberg in *IEEE Computer*, 1983, pp. 22-34.) Finally, the image was converted to a binary image by applying a threshold. The threshold parameters were chosen such that pixels with values between 19 and 255 (on a scale of 0 to 255) were set to "black", and the remaining pixels were set to "white". The resulting processed image (FIG. 19) was determined to be machine readable using the i-nigma QR Code reader (available from 3GVision, Or Yehuda, Israel).

In the construction that used the diffuse white backing as a contrast enhancing layer, the contrast of the image was also sensitive to the incident viewing direction of the iPhone4 camera. When the image was viewed along (parallel to) the scan direction of the laser, the contrast was lower than when the image was viewed orthogonal to the scan direction of the laser.

Example 3

A spatially tailorable optical film, which functioned as a patterned layer for this Example 3, was made similarly to Multilayer Optical Film 7 of the Examples in WO 2010/075363 (Merrill et al.), and is referred to here as Film F. Before pattern-wise laser treatment, this Film F was generally clear with a slightly gray hue. (As described in the '363 Merrill et al. document, this film, when appropriately heated, exhibits an increase in refractive index difference between microlayers in the optical stack, which increases the reflectivity of the film at blue visible wavelengths.) The Film F was then laser patterned as a free-standing, non-laminated film using the procedures generally described in Example 2. During this procedure, a clear glass plate was set atop Film F to reduce wrinkling during processing, as well as provide a heat sink that may have otherwise been provided by a laminated coating. Process conditions for the laser patterning of Film F included an average maximum power of 3.2 Watts as measured by a thermopile sensor (LabMax-TOP, Coherent, Inc., Santa Clara, Calif.) and a lineal pixel density of 700 dots per inch (dpi). The laser patterning was carried out to produce a pattern in the Film F in the form of the same QR Code used in Example 2. The transmission spectrum of treated portions (those that were heated with the scanning laser) and untreated portions of the Film F were measured with the Lambda 950 spectrophotometer, and are shown in FIG. 20. In that figure, curve 2010 corresponds to the treated portions, which we may refer to as first portions of the Film F because they selectively filter a portion of blue visible light from other visible wavelengths, and curve 2012 corresponds to the untreated portions of the Film F. Keeping in mind that % transmission+% reflectivity+% absorption is about 100% (and Film F is made of polymer materials having low absorption, except in or near the ultraviolet and IR regions, the low absorption of Film F in the visible being approximately the same before and after laser treatment, although under some laser treatment conditions the IR dye contribution to the absorption may change slightly, e.g., by a few percent), one can see by inspection of FIG. 20 that the laser treatment had the effect of selectively increasing the reflectivity of the treated portions (curve 2010) of the Film for some blue visible wavelengths (see e.g. 500 nm) by approximately 12%.

The patterned Film F was then placed on top of a retroreflective contrast enhancing layer, and an indicia layer was placed on top of Film F. The indicia layer was a clear transparent film on which multicolored floral images were printed using a color printer. Visible images of this construction were taken with a Galaxy S2 smart phone (available from Samsung, Seoul, Korea). FIG. 21 shows a grayscale version of the (full color) image taken with this device using only ambient light (no flash), and FIG. 22 shows a grayscale version of the (full color) image taken under the same conditions except that the flash of the smart phone device was used. The QR Code of the patterned Film F can be easily seen in FIG. 22. The image of FIG. 22 can be further processed, e.g. by isolating blue color components of the full color image and applying other suitable image processing techniques as described above, so that the information in the inconspicuous QR Code pattern can be machine read or deciphered using the smart phone.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. An optical tag having an inconspicuous pattern, comprising:
   a patterned layer having distinguishable first and second portions that define the pattern, the first portions selectively filtering at least a portion of blue visible light from other visible light wavelengths, wherein the patterned layer comprises a multilayer optical film that has reduced birefringence of at least some of the interior layers in the first portion relative to the second portion and reflects and transmits visible light differently in the first and second portions of the patterned layer;
   an indicia layer disposed to overlap the pattern so as to mark a location of the pattern; and
   a contrast enhancing layer disposed behind the patterned layer and configured to enhance a contrast of the pattern.

2. The tag of claim 1, wherein the pattern comprises a machine-readable bar code pattern.

3. The tag of claim 1, wherein the pattern comprises a logo, image, text, or symbol.

4. The tag of claim 1, wherein the indicia layer is disposed between the patterned layer and the contrast enhancing layer.

5. The tag of claim 4, wherein, at normal incidence, the first portions selectively block the portion of blue visible light and substantially transmit the other visible light wavelengths.

6. The tag of claim 5, wherein, at normal incidence, the second portions substantially transmit the portion of blue visible light and also substantially transmit the other visible light wavelengths.

7. The tag of claim 5, wherein the portion of blue visible light is defined by a spectral band having at normal incidence a long wavelength band edge of no greater than 480 nm.

8. The tag of claim 7, wherein the long wavelength band edge is no greater than 440 nm.

9. The tag of claim 5, wherein the first portions selectively block the portion of blue visible light by selectively reflecting the portion of blue visible light.

10. The tag of claim 1, wherein the patterned layer is disposed between the indicia layer and the contrast enhancing layer.

11. The tag of claim 10, wherein, at normal incidence, the first portions selectively transmit the portion of blue visible light and substantially block the other visible light wavelengths.

12. The tag of claim 11, wherein, at normal incidence, the second portions substantially block the portion of blue visible light and also substantially block the other visible light wavelengths.

13. The tag of claim 11, wherein the portion of blue visible light is defined by a spectral band having at normal incidence a long wavelength band edge of no greater than 480 nm.

14. The tag of claim 11, wherein the first portions selectively block the other visible light wavelengths by selectively reflecting the other visible light wavelengths.

15. The tag of claim 13, wherein the long wavelength band edge is no greater than 440 nm.

16. The tag of claim 10, wherein the indicia layer covers the patterned layer, and wherein the indicia layer comprises an indicia portion that covers at least a portion of the pattern, the indicia portion having light-blocking regions and light-transmitting regions.

17. The tag of claim 16, wherein the light-transmitting regions comprise perforations in the indicia layer.

18. The tag of claim 17, wherein the pattern comprises a bar code pattern, and wherein the perforations are sized and distributed such that enough of the bar code pattern can be detected so that the bar code pattern can be read.

19. The tag of claim 1, wherein the contrast enhancing layer is diffusely reflective.

20. The tag of claim 1, wherein the contrast enhancing layer is retroreflective.

21. The tag of claim 1, wherein the contrast enhancing layer is absorptive.

22. The tag of claim 1, wherein the indicia layer at least partially obscures the pattern.

23. The tag of claim 1, wherein the pattern comprises a first machine-readable bar code pattern, and the indicia layer comprises a second machine-readable bar code pattern different from the first machine-readable bar code pattern.

24. A method of reading an optical tag having an inconspicuous pattern, the method comprising:
    illuminating the tag of claim 1;
    imaging the illuminated tag to provide a full-color image, the full-color image having red, green, and blue color components; and
    isolating the blue color components to provide a monochrome image from the full-color image, the monochrome image providing enhanced detection of the pattern relative to the full-color image.

25. The method of claim 24, wherein the pattern comprises a machine-readable bar code pattern, the method further comprising:
    analyzing the monochrome image to read the bar code pattern.

26. The method of claim 24, wherein the imaging is carried out by a camera, and wherein the tag comprises a retroreflective layer, and wherein the illuminating occurs along a first optical path and the camera images the tag along a second optical path, and the first and second optical paths are sufficiently aligned so that retroreflected light enhances contrast of the pattern in the monochrome image.

27. The method of claim 24, wherein the illuminating and imaging are carried out by a handheld device.

28. The method of claim 27, wherein the isolating is also carried out by the handheld device.

29. The method of claim 27, wherein the handheld device is a mobile phone.

30. A method of reading an optical tag having an inconspicuous pattern, the method comprising:
    illuminating the tag of claim 1;
    imaging the illuminated tag to provide a full-color image, the full-color image having first, second, and third color components; and
    isolating the first color components to provide a monochrome image from the full-color image, the monochrome image providing enhanced detection of the pattern relative to the full-color image.

31. The method of claim 30, wherein the first, second, and third color components are blue, green, and red color components respectively.

32. An optical tag having an inconspicuous machine-readable bar code pattern, comprising:
    a patterned layer having distinguishable first and second portions that define the bar code pattern, the first portions selectively filtering a first spectral portion of light from other light wavelengths, wherein the patterned layer comprises a multilayer optical film that has reduced birefringence of at least some of the interior layers in the first portion relative to the second portion and reflects and transmits visible light differently in the first and second portions of the patterned layer;
    an indicia layer disposed to overlap the bar code pattern so as to mark a location of the bar code pattern; and
    a contrast enhancing layer disposed behind the patterned layer and configured to enhance a contrast of the bar code pattern.

33. The tag of claim 32, wherein the first spectral portion of light is defined by a spectral band having at normal incidence a long wavelength band edge of no greater than 480 nm.

34. The tag of claim 32, wherein the first spectral portion of light is defined by a spectral band having at normal incidence a short wavelength band edge of no less than 630 nm.

35. The tag of claim 32, wherein the first spectral portion of light is defined by a spectral band having at normal incidence a short wavelength band edge of no less than 950 nm.

36. The tag of claim 32, wherein the indicia layer comprises a second machine-readable bar code pattern different from the machine-readable bar code pattern of the patterned layer.

* * * * *